US012335842B2

(12) United States Patent
Akl et al.

(10) Patent No.: US 12,335,842 B2
(45) Date of Patent: Jun. 17, 2025

(54) HANDOVER COMMAND DELIVERY VIA A TARGET PATH IN AN INTEGRATED ACCESS AND BACKHAUL CONFIGURATION

(71) Applicant: QUALCOMM Incorporated, San Diego, CA (US)

(72) Inventors: Naeem Akl, Bridgewater, NJ (US); Karl Georg Hampel, Jersey City, NJ (US); Ozcan Ozturk, San Diego, CA (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/325,643

(22) Filed: May 30, 2023

(65) Prior Publication Data

US 2023/0300717 A1 Sep. 21, 2023

Related U.S. Application Data

(62) Division of application No. 17/364,610, filed on Jun. 30, 2021, now Pat. No. 11,706,690.

(Continued)

(51) Int. Cl.
*H04W 40/36* (2009.01)
*H04W 36/00* (2009.01)
(Continued)

(52) U.S. Cl.
CPC ....... *H04W 40/36* (2013.01); *H04W 36/0019* (2023.05); *H04W 36/0064* (2023.05); *H04W 36/38* (2013.01); *H04W 36/087* (2023.05)

(58) Field of Classification Search
CPC . H04W 40/36; H04W 36/0011; H04W 36/38; H04W 36/08; H04W 36/0055
See application file for complete search history.

(56) References Cited

U.S. PATENT DOCUMENTS

| 2007/0025333 A1 | 2/2007 | Sylvain |
| 2020/0120576 A1 | 4/2020 | Luo et al. |

(Continued)

OTHER PUBLICATIONS

Huawei: "Inter IAB Donor-CU Topology Adaptation", 3GPP Draft, 3GPP TSG-RAN WG3 meeting #105, R3-194347, Inter IAB Donor-CU Topology Adaptation, 3rd Generation Partnership Project (3GPP), Mobile Competence Centre, 650, Route Des Lucioles, F-06921 Sophia-Antipolis Cedex, France, vol. RAN WG3, No. Ljubljana, Slovenia, Aug. 26, 2019-Aug. 30, 2019, Aug. 17, 2019 (Aug 17, 2019), XP051770539, 4 Pages, Section 2.

(Continued)

*Primary Examiner* — Jamal Javaid
(74) *Attorney, Agent, or Firm* — Harrity & Harrity, LLP

(57) ABSTRACT

Various aspects of the present disclosure generally relate to wireless communication. In some aspects, an integrated access and backhaul (IAB) node may receive, from a first IAB donor centralized unit (CU) via a first parent distributed unit (DU), a first indication to establish a first connection with a second parent DU associated with a second IAB donor CU. The IAB node may establish the first connection with the second parent DU. The IAB node may establish a second connection with the first IAB donor CU via the second parent DU, the first connection and the second connection forming a target path between the IAB node and (Continued)

the first IAB donor CU. Numerous other aspects are provided.

30 Claims, 15 Drawing Sheets

Related U.S. Application Data

(60) Provisional application No. 63/198,290, filed on Oct. 8, 2020, provisional application No. 62/705,722, filed on Jul. 13, 2020.

(51) Int. Cl.
*H04W 36/38* (2009.01)
*H04W 36/08* (2009.01)

(56) References Cited

U.S. PATENT DOCUMENTS

| | | | |
|---|---|---|---|
| 2020/0120725 A1* | 4/2020 | Mildh | H04W 76/12 |
| 2020/0245402 A1 | 7/2020 | Chiu et al. | |
| 2020/0396611 A1* | 12/2020 | Rajadurai | H04L 63/0869 |
| 2021/0227435 A1* | 7/2021 | Hsieh | H04W 36/087 |
| 2022/0015010 A1 | 1/2022 | Akl et al. | |

OTHER PUBLICATIONS

International Search Report and Written Opinion—PCT/US2021/040144—ISA/EPO—Nov. 10, 2021.
Samsung: "(TP for NR-IAB BL CR for 38.401) Stage 2 clean-up for IAB", 3GPP Draft, 3GPP TSG-RAN WG3 #107bis-e, R3-202836, 3rd Generation Partnership Project (3GPP), Mobile Competence Centre, 650, Route Des Lucioles, F-06921 Sophia-Antipolis Cedex, France, vol. RAN WG3, No. Online, Apr. 20, 2020-Apr. 30, 2020, May 4, 2020 (May 4, 2020), XP051881029, 15 Pages, section 8.2.x.
ZTE: et al., "Discussion on Inter-CU IAB Migration Handling", 3GPP Draft, 3GPP TSG RAN WG3 Meeting #105, R3-193655, Discussion on Inter-CU IAB Migration Handling, 3rd Generation Partnership Project (3GPP), Mobile Competence Centre, 650, Route Des Lucioles, F-06921 Sophia-Antipolis Cedex, France, vol. RAN WG3, No. Ljubljana, Slovenija, Aug. 26, 2019-Aug. 30, 2019, Aug. 17, 2019 (Aug. 17, 2019), XP051769859, 4 Pages, section 2.
European Search Report—EP24191825—Search Authority—Munich—Nov. 6, 2024.

* cited by examiner

HANDOVER COMMAND DELIVERY VIA A TARGET PATH IN AN INTEGRATED ACCESS AND BACKHAUL CONFIGURATION

CROSS-REFERENCE TO RELATED APPLICATIONS

This application is a divisional of U.S. patent application Ser. No. 17/364,610, filed Jun. 30, 2021, entitled "HANDOVER COMMAND DELIVERY VIA A TARGET PATH IN AN INTEGRATED ACCESS AND BACKHAUL CONFIGURATION," which claims priority to U.S. Provisional Patent Application No. 62/705,722, filed on Jul. 13, 2020, entitled "HANDOVER COMMAND DELIVERY VIA A TARGET PATH IN AN INTEGRATED ACCESS AND BACKHAUL CONFIGURATION," and to U.S. Provisional Patent Application No. 63/198,290, filed on Oct. 8, 2020, entitled "HANDOVER COMMAND DELIVERY VIA A TARGET PATH IN AN INTEGRATED ACCESS AND BACKHAUL CONFIGURATION," which are assigned to the assignee hereof. The contents of which are incorporated herein by reference in their entireties.

FIELD OF THE DISCLOSURE

Aspects of the present disclosure generally relate to wireless communication and, more specifically, to handover command delivery via a target path in an integrated access and backhaul configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A radio access network (RAN) may include a wireless backhaul network, sometimes referred to as an integrated access and backhaul (IAB) network. In an IAB network, at least one base station is an anchor base station that communicates with a core network via a wired backhaul link, such as a fiber connection. An anchor base station may also be referred to as an IAB donor (or IAB-donor). The IAB network may include one or more non-anchor base stations, sometimes referred to as relay base stations or IAB nodes (or IAB-nodes). An IAB donor may include a centralized unit (CU), which may perform access node controller (ANC) functions, access management function (AMF) functions, or other examples. The CU may configure one or more decentralized units (DUs) of the IAB donor or may configure one or more IAB nodes 410 (such as a mobile terminal (MT) or a DU of an IAB node) that connect to the core network via the IAB donor.

In an IAB deployment, an IAB node may hand over a UE from a first IAB donor CU to a second IAB donor CU. Handover messages may be delivered to the UE from the first IAB donor CU via an IAB parent DU associated with the first IAB donor CU, which may be referred to as a source path. However, the source path may suffer from reduced reliability and increased latency due to degraded coverage and channel conditions on the source path or due to a large quantity of UEs or other IAB nodes being served by the IAB parent DU. As a result, the handover messages directed to the UE may become delayed or dropped, which can cause delays in the handover.

SUMMARY

In some aspects, a method of wireless communication, performed by an integrated access and backhaul (IAB) node, includes receiving, from a first IAB donor centralized unit (CU) via a first parent distributed unit (DU) associated with the first IAB donor CU, a first indication to establish a first connection with a second parent DU associated with a second IAB donor CU. The method includes establishing the first connection with the second parent DU based at least in part on receiving the first indication. The method includes establishing a second connection with the first IAB donor CU via the second parent DU, the first connection and the second connection forming a target path between the IAB node and the first IAB donor CU.

In some aspects, an IAB node for wireless communication may include at least one processor and at least one memory communicatively coupled with the at least one processor. The at least one memory stores processor-readable code that, when executed by the at least one processor, is configured to cause the IAB node to receive, from a first IAB donor CU via a first parent DU associated with the first IAB donor CU, a first indication to establish a first connection with a second parent DU associated with a second IAB donor CU. The at least one memory stores processor-readable code that, when executed by the at least one processor, is configured to cause the IAB node to establish the first connection with the second parent DU based at least in part on receiving the first indication. The at least one memory stores processor-readable code that, when executed by the at least one processor, is configured to cause the IAB node to establish a second connection with the first IAB donor CU via the second parent DU, the first connection and the second connection forming a target path between the IAB node and the first IAB donor CU.

In some aspects, a non-transitory computer-readable medium may store one or more instructions for wireless communication. The one or more instructions, when executed by one or more processors of an IAB node, causes the one or more processors to receive, from a first IAB donor CU via a first parent DU associated with the first IAB donor CU, a first indication to establish a first connection with a second parent DU associated with a second IAB donor CU. The one or more instructions, when executed by one or more processors of the IAB node, causes the one or more processors to establish the first connection with the second parent DU based at least in part on receiving the first indication. The one or more instructions, when executed by one or more processors of the IAB node, causes the one or more processors to establish a second connection with the first IAB donor CU via the second parent DU, the first connection and the second connection forming a target path between the IAB node and the first IAB donor CU.

In some aspects, an apparatus for wireless communication includes means for receiving, from a first IAB donor CU via a first parent DU associated with the first IAB donor CU, a first indication to establish a first connection with a second parent DU associated with a second IAB donor CU. The apparatus includes means for establishing the first connection with the second parent DU based at least in part on receiving the first indication. The apparatus includes means for establishing a second connection with the first IAB donor CU via the second parent DU, the first connection and the second connection forming a target path between the IAB node and the first IAB donor CU.

In some aspects, a method of wireless communication, performed by a first IAB donor CU, includes transmitting, to an IAB node via a first parent DU associated with the first IAB donor CU, a first indication to establish a first connection with a second parent DU associated with a second IAB donor CU. The method includes establishing a second connection with the IAB node via the second parent DU, the first connection and the second connection forming a target path between the IAB node and the first IAB donor CU.

In some aspects, a first IAB donor CU for wireless communication may include at least one processor and at least one memory communicatively coupled with the at least one processor. The at least one memory stores processor-readable code that, when executed by the at least one processor, is configured to cause the first IAB donor CU to transmit, to an IAB node via a first parent DU associated with the first IAB donor CU, a first indication to establish a first connection with a second parent DU associated with a second IAB donor CU. The at least one memory stores processor-readable code that, when executed by the at least one processor, is configured to cause the first IAB donor CU to establish a second connection with the IAB node via the second parent DU, the first connection and the second connection forming a target path between the IAB node and the first IAB donor CU.

In some aspects, a non-transitory computer-readable medium may store one or more instructions for wireless communication. The one or more instructions, when executed by one or more processors of a first IAB donor CU, causes the one or more processors to transmit, to an IAB node via a first parent DU associated with the first IAB donor CU, a first indication to establish a first connection with a second parent DU associated with a second IAB donor CU. The one or more instructions, when executed by the one or more processors of the first IAB donor CU, causes the one or more processors to establish a second connection with the IAB node via the second parent DU, the first connection and the second connection forming a target path between the IAB node and the first IAB donor CU.

In some aspects, a first apparatus for wireless communication includes means for transmitting, to an IAB node via a first parent DU associated with the apparatus, a first indication to establish a first connection with a second parent DU associated with a second apparatus. The first apparatus includes means for establishing a second connection with the IAB node via the second parent DU, the first connection and the second connection forming a target path between the IAB node and the first apparatus.

In some aspects, a method of wireless communication performed by a first IAB donor CU includes receiving, from a second IAB donor CU associated with an IAB node, a request for transport network layer (TNL) address information for a connection between the second IAB donor CU and the IAB node via an IAB donor DU associated with the first IAB donor CU. The method includes obtaining the TNL address information from the IAB donor DU based at least in part on receiving the request. The method includes transmitting the TNL address information to the second IAB donor CU.

In some aspects, a first IAB donor CU for wireless communication includes at least one processor and at least one memory communicatively coupled with the at least one processor. The at least one memory stores processor-readable code that, when executed by the at least one processor, is configured to cause the first IAB donor CU to receive, from a second IAB donor CU associated with an IAB node, a request for TNL address information for a connection between the second IAB donor CU and the IAB node via an IAB donor DU associated with the first IAB donor CU. The at least one memory stores processor-readable code that, when executed by the at least one processor, is configured to cause the first IAB donor CU to obtain the TNL address information from the IAB donor DU based at least in part on receiving the request. The memory and the one or more processors configured to transmit the TNL address information to the second IAB donor CU.

In some aspects, a non-transitory computer-readable medium storing one or more instructions for wireless communication includes one or more instructions that, when executed by one or more processors of a first IAB donor CU, cause the one or more processors to receive, from a second IAB donor CU associated with an IAB node, a request for TNL address information for a connection between the second IAB donor CU and the IAB node via an IAB donor DU associated with the first IAB donor CU. The one or more instructions, when executed by the one or more processors of the first IAB donor CU, cause the one or more processors to obtain the TNL address information from the IAB donor DU based at least in part on receiving the request. The one or more instructions, when executed by the one or more processors of the first IAB donor CU, cause the one or more processors to transmit the TNL address information to the second IAB donor CU.

In some aspects, a first apparatus for wireless communication includes means for receiving, from a second apparatus associated with an IAB node, a request for TNL address information for a connection between the second apparatus and the IAB node via an IAB donor DU associated with the first apparatus. The first apparatus includes means for obtaining the TNL address information from the IAB donor DU based at least in part on receiving the request. The first apparatus includes means for transmitting the TNL address information to the second apparatus.

In some aspects, a method of wireless communication performed by a first IAB donor CU includes transmitting, to a second IAB donor CU, a request for first TNL address information for a connection between the first IAB donor CU and an IAB node associated with the first IAB donor CU, the connection being via an IAB donor DU associated with the second IAB donor CU. The method includes receiving the first TNL address information from the second IAB donor CU based at least in part on transmitting the request. The method includes determining second TNL address information based at least in part on the first TNL address information. The method includes transmitting the second TNL address information to the IAB node.

In some aspects, a first IAB donor CU for wireless communication includes at least one processor and at least one memory communicatively coupled with the at least one processor. The at least one memory stores processor-readable code that, when executed by the at least one processor, is configured to cause the first IAB donor CU to transmit, to a second IAB donor CU, a request for first TNL address information for a connection between the first IAB donor CU and an IAB node associated with the first IAB donor CU, the connection being via an IAB donor DU associated with the second IAB donor CU. The at least one memory stores processor-readable code that, when executed by the at least one processor, is configured to cause the first IAB donor CU to receive the first TNL address information from the second IAB donor CU based at least in part on transmitting the request. The at least one memory stores processor-readable code that, when executed by the at least one processor, is configured to cause the first IAB donor CU to determine second TNL address information based at least in part on the first TNL address information. The at least one memory stores processor-readable code that, when executed by the at least one processor, is configured to cause the first IAB donor CU to transmit the second TNL address information to the IAB node.

In some aspects, a non-transitory computer-readable medium storing one or more instructions for wireless communication includes one or more instructions that, when executed by one or more processors of a first IAB donor CU, cause the one or more processors to: transmit, to a second IAB donor CU, a request for first TNL address information for a connection between the first IAB donor CU and an IAB node associated with the first IAB donor CU, the connection being via an IAB donor DU associated with the second IAB donor CU. The one or more instructions, when executed by the one or more processors of the first IAB donor CU, cause the one or more processors to receive the first TNL address information from the second IAB donor CU based at least in part on transmitting the request. The one or more instructions, when executed by the one or more processors of the first IAB donor CU, cause the one or more processors to determine second TNL address information based at least in part on the first TNL address information. The one or more instructions, when executed by the one or more processors of the first IAB donor CU, cause the one or more processors to transmit the second TNL address information to the IAB node.

In some aspects, a first apparatus for wireless communication includes means for transmitting, to a second apparatus, a request for first TNL address information for a connection between the first apparatus and an IAB node associated with the apparatus, the connection being via an IAB donor DU associated with the second apparatus. The first apparatus includes means for receiving the first TNL address information from the second apparatus based at least in part on transmitting the request. The first apparatus includes determining second TNL address information based at least in part on the first TNL address information. The first apparatus includes means for transmitting the second TNL address information to the IAB node.

Aspects generally include a method, apparatus, system, computer program product, non-transitory computer-readable medium, user equipment, base station, IAB node, IAB donor CU, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
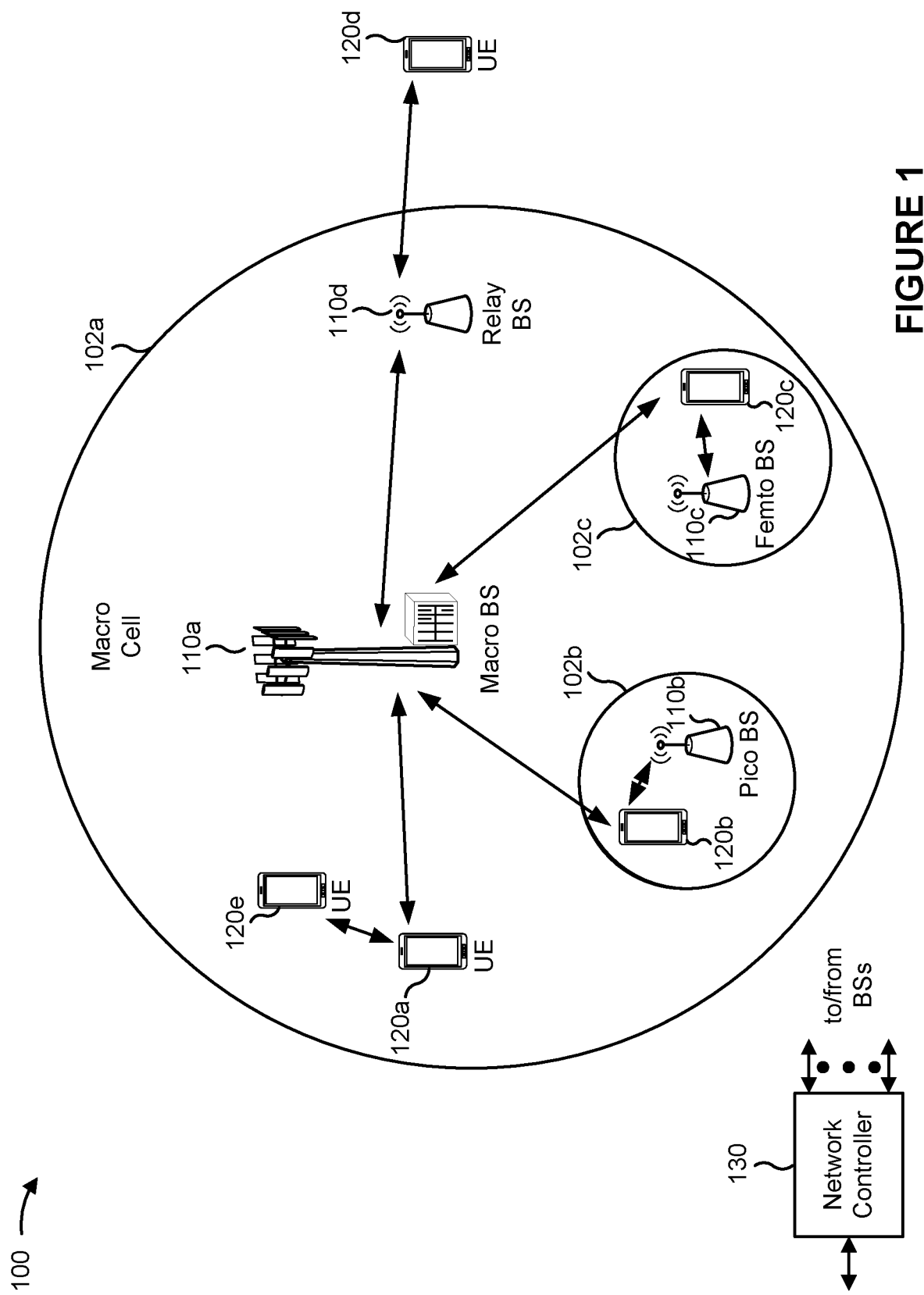
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

In an integrated access and backhaul (IAB) deployment, an IAB node may hand over a user equipment (UE) from a first IAB donor centralized unit (CU) to a second IAB donor CU. Handover messages may be delivered to the UE from the first IAB donor CU via an IAB parent distributed unit (DU) associated with the first IAB donor CU, which may be referred to as a source path. The source path may be a connection path of one or more nodes (such as IAB nodes, IAB parents, IAB donors, or a combination thereof) along which the UE communicates with a first IAB donor CU prior to handover to a second IAB donor CU. However, the source path may suffer from reduced reliability and increased latency due to degraded coverage and channel conditions on the source path or due to a large quantity of UEs and other IAB nodes being served by the IAB parent DU. As a result, the handover messages directed to the UE may become delayed or dropped, which can cause delays in the handover.

Various aspects relate generally to handover command delivery via a target path in an integrated access and backhaul configuration. Some aspects more specifically relate to an IAB node serving a child node such as a UE or another IAB node. The child node may be handed over from a first IAB donor CU to a second IAB donor CU. As part of the handover, the IAB node may migrate a connection between a DU of the IAB node and the first IAB donor CU from a first IAB parent DU to a second IAB parent DU. The first IAB donor CU may transmit a handover command (or other types of handover communications) to the IAB node via a target path (or a portion thereof) prior to or during handover of the child node to the second IAB donor CU. The target path may be a connection path of one or more nodes (such as IAB nodes, IAB parents, IAB donors, or a combination thereof) along which the UE is to communicate with the second IAB donor CU after handover to the second IAB donor CU.

Particular aspects of the subject matter described in this disclosure can be implemented to realize one or more of the following potential advantages. In some examples, the described techniques can be used to provide handover commands and other handover messages to the child node via the target path as opposed to the source path. In this way, the handover commands and other handover messages may be provided to the child node such that the handover commands and other handover messages are not affected by degraded coverage and channel conditions on the source path. Instead, the handover commands and other handover messages may be provided on the more reliable target path, which decreases delays in the delivery of the handover commands and other handover messages, decreases the likelihood that the handover commands and other handover messages will be dropped, or otherwise decreases delays in the handover of the child node.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
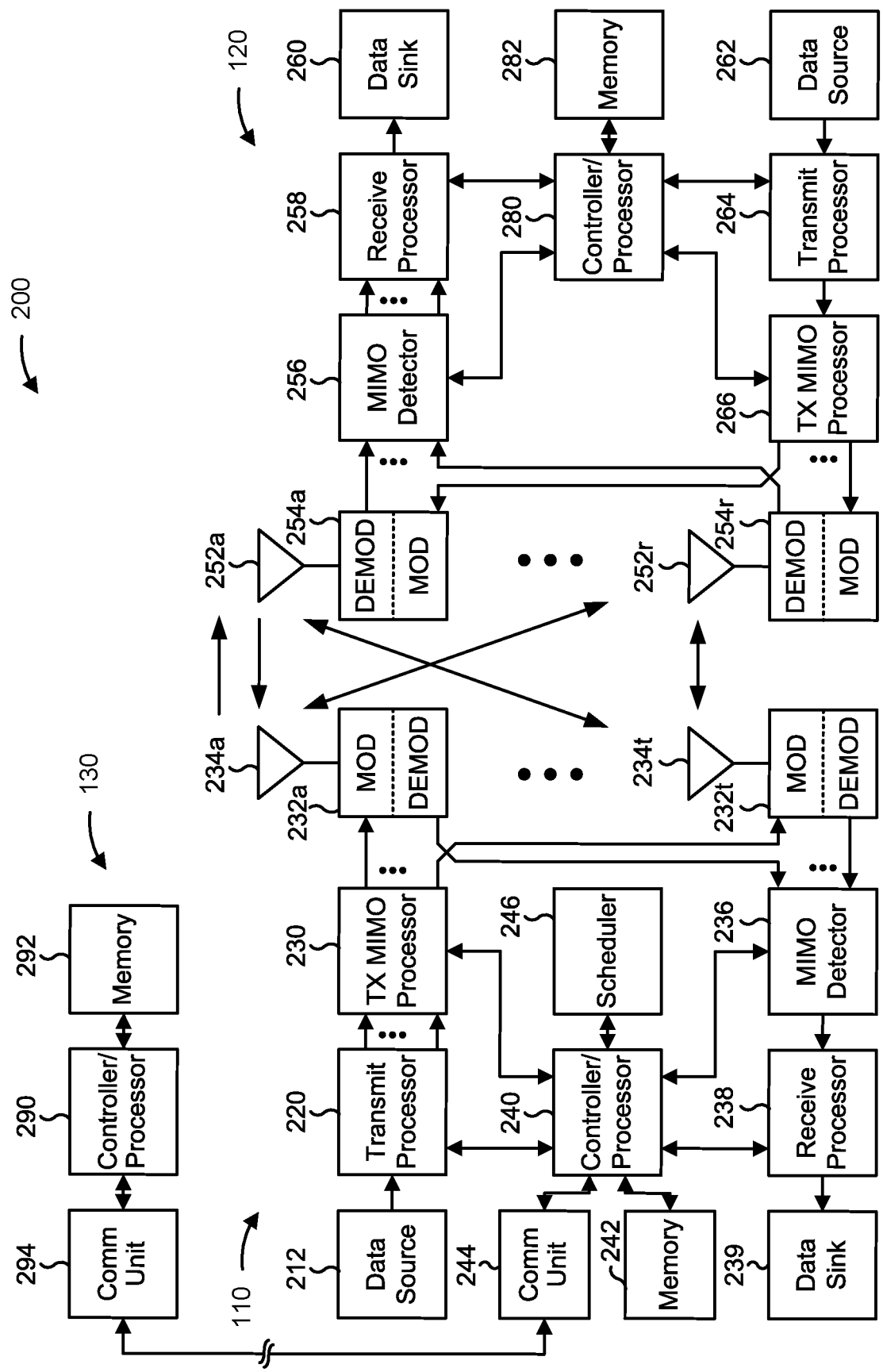
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP), a received signal strength indicator (RSSI), a reference signal received quality (RSRQ), or a CQI, among other examples, or combinations thereof. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t and/or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission and/or reception components, such as one or more components of 2.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. In some aspects, a modulator and a demodulator (such as MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (such as MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with handover command delivery via a target path in an IAB configuration, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, process 1000 of FIG. 10, process 1100 of FIG. 11, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, process 1000 of FIG. 10, process 1100 of FIG. 11, or other processes as described herein. In some aspects, executing instructions may include running the instructions, converting the instructions, compiling the instructions, or interpreting the instructions, among other examples.

In some aspects, a base station 110 implementing an IAB node may include means for receiving, from a first IAB donor CU via a first parent DU associated with the first IAB donor CU, a first indication to establish a first connection with a second parent DU associated with a second IAB donor CU, means for establishing the first connection with the second parent DU based at least in part on receiving the first indication, means for establishing a second connection with the first IAB donor CU via the second parent DU, the first connection and the second connection forming a target path between the IAB node and the first IAB donor CU, means for receiving, via the target path, a second indication to transfer a child node from the first IAB donor CU to the second IAB donor CU, or means for transmitting a third indication to the child node for the child node to establish a third connection with the second IAB donor CU, among other examples, or combinations thereof. In some aspects, a base station 110 implementing a first IAB donor CU may include means for transmitting, to an IAB node via a first parent DU associated with the first IAB donor CU, a first indication to establish a first connection with a second parent DU associated with a second IAB donor CU, or means for establishing a second connection with the IAB node via the second parent DU, the first connection and the second connection forming a target path between the IAB node and the first IAB donor CU, or combinations thereof.

In some aspects, a base station 110 implementing a first IAB donor CU may include means for receiving, from a second IAB donor CU associated with an IAB node, a request for TNL address information for a connection between the second IAB donor CU and the IAB node via an IAB donor DU associated with the first IAB donor CU, means for obtaining the TNL address information from the IAB donor DU based at least in part on receiving the request, and means for transmitting the TNL address information to the second IAB donor CU. In some aspects, a base station 110 implementing a first IAB donor CU may include means transmitting, to a second IAB donor CU, a request for first TNL address information for a connection between the first IAB donor CU and an IAB node associated with the first IAB donor CU, the connection being via an IAB donor DU associated with the second IAB donor CU, means for receiving the first TNL address information from the second IAB donor CU based at least in part on transmitting the request, means for determining second TNL address information based at least in part on the first TNL address information, means for transmitting the second TNL address information to the IAB node.

In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234, among other examples.

Figure 3:
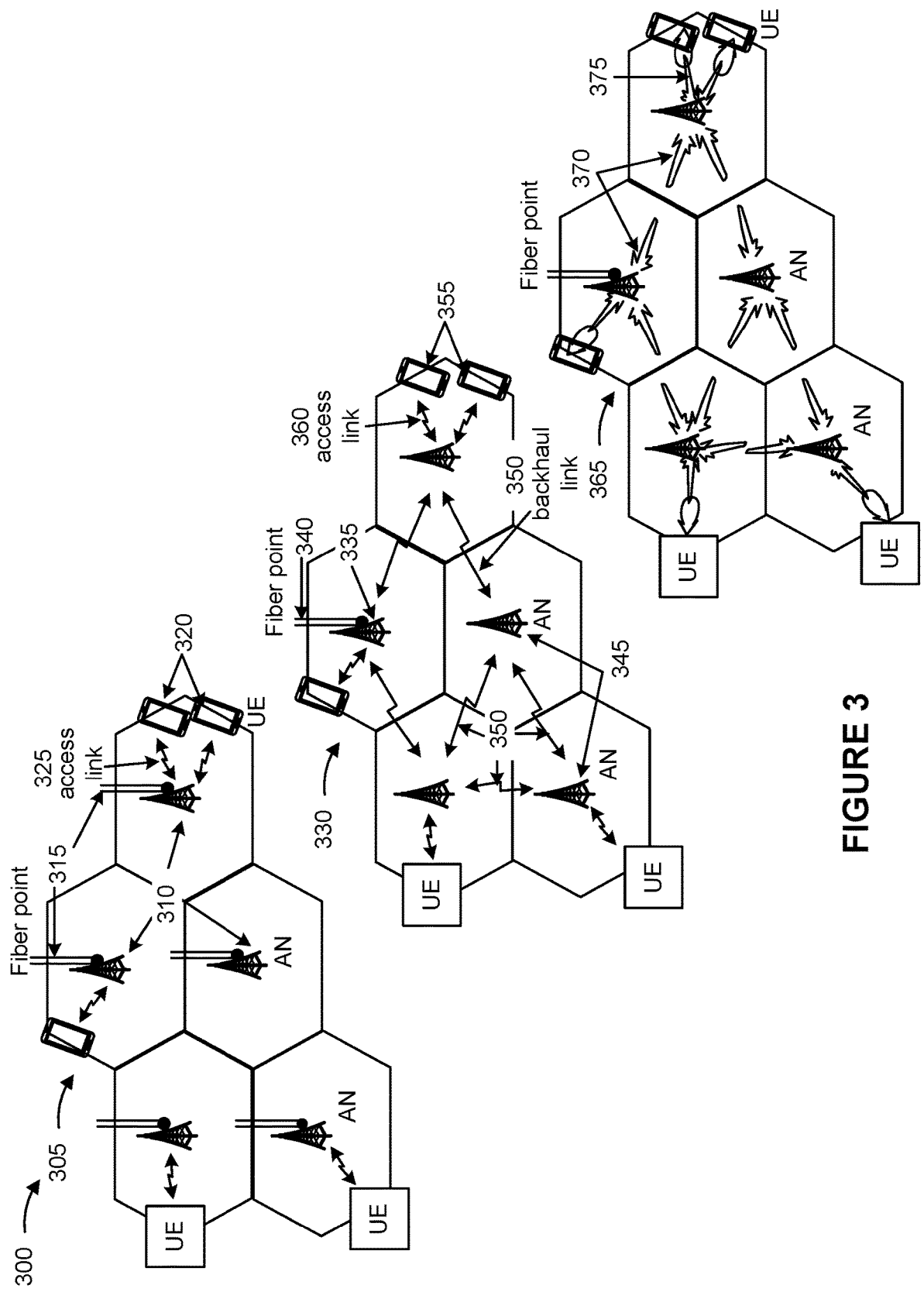
FIG. 3 is a diagram illustrating examples of radio access networks in accordance with the present disclosure.

FIG. 3 is a diagram illustrating examples 300 of radio access networks, in accordance with the present disclosure.

As shown in FIG. 3, a traditional radio access network 305 (such as, 3G, 4G, LTE, or other examples) may include multiple base stations 310 (or access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As further shown in FIG. 3, a radio access network 330 may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (for example, via one or more non-anchor base stations 345) to form a backhaul path to the core network for carrying backhaul traffic. Backhaul link 350 may be a wireless link. Anchor base station(s) 335 or non anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

As further shown in FIG. 3, in some aspects, a radio access network 365 that includes an IAB network may utilize millimeter wave technology or directional communications (such as beamforming or other examples) for communications between base stations or UEs (for example, between two base stations, between two UEs, or between a base station and a UE). For example, wireless backhaul links 370 between base stations may use millimeter wave signals to carry information or may be directed toward a target base station using beamforming or other examples. Similarly, the wireless access links 375 between a UE and a base station may use millimeter wave signals or may be directed toward a target wireless node (such as a UE or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (such as a peer-to-peer network, a device-to-device network, or other examples). In this case, an anchor node may refer to a UE that is directly in communication with a base station (such as an anchor base station or a non-anchor base station).

Figure 4:
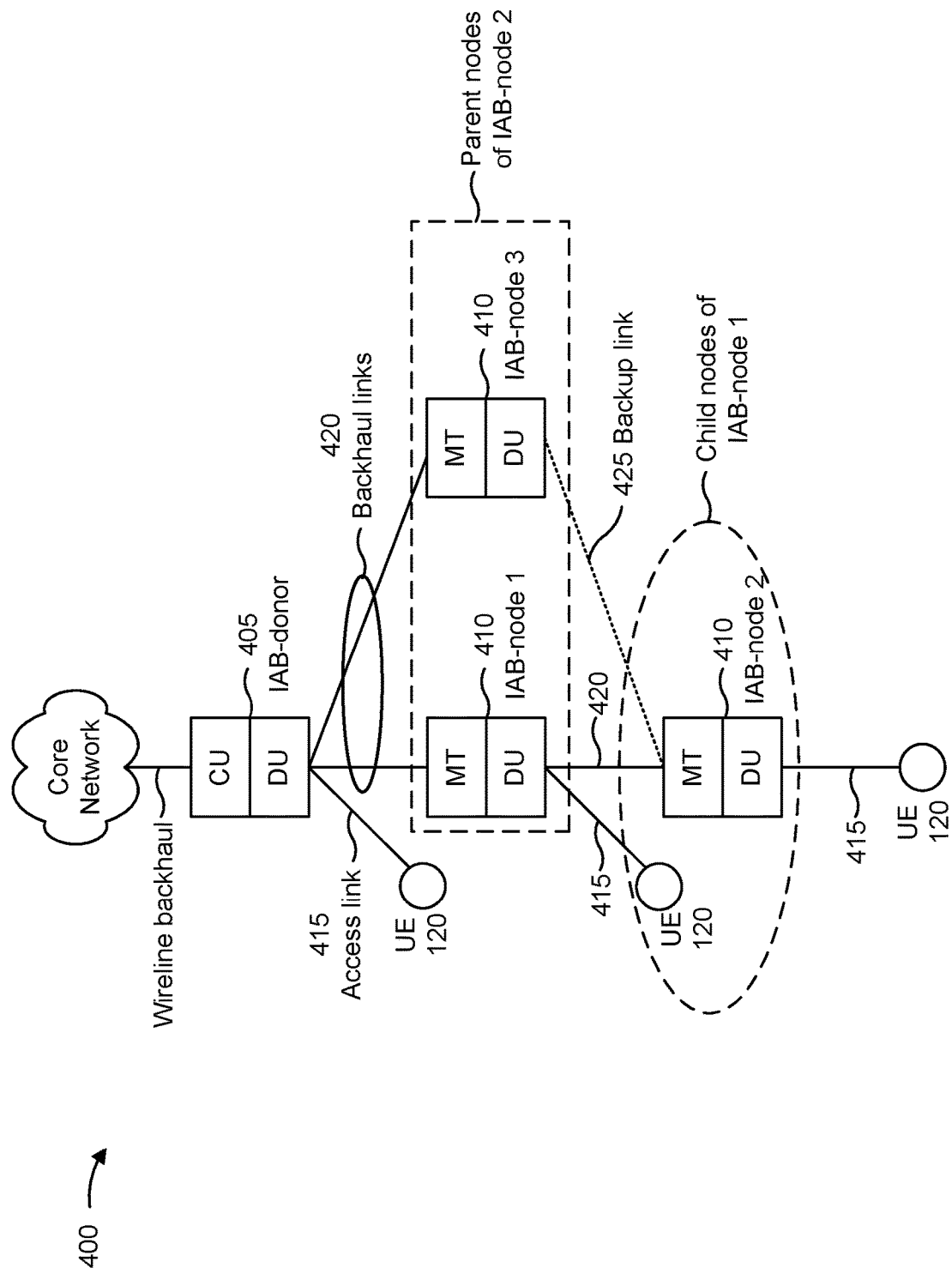
FIG. 4 is a diagram illustrating an example of an integrated access and backhaul (IAB) network architecture in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a CU, which may perform access node controller (ANC) functions, AMF functions, or other examples. The CU may configure a DU of the IAB donor 405 or may configure one or more IAB nodes 410 (such as a mobile terminal (MT) or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message, or other examples).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile terminal (MT) functions (also sometimes referred to as UE functions (UEF)) and may include DU functions (also sometimes referred to as access node functions (ANF)). The MT functions of an IAB node 410 (a child node) may be controlled or scheduled by another IAB node 410 (such as a parent node of the child node) or by an IAB donor 405. The DU functions of an IAB node 410 (a parent node) may control or schedule other IAB nodes 410 (such as child nodes of the parent node) or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, or schedule communications of IAB nodes 410 or UEs 120. A UE 120 may include only MT functions, and not DU functions. That is, communications of a UE 120 may be controlled or scheduled by an IAB donor 405 or an IAB node 410 (for example, a parent node of the UE 120).

When a first node controls or schedules communications for a second node (for example, when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control or schedule communications for child nodes of the parent node. A parent node may be an IAB donor 405 or an IAB node 410, and a child node may be an IAB node 410 or a UE 120. Communications of an MT function of a child node may be controlled or scheduled by a parent node of the child node.

As further shown in FIG. 4, a link between a UE 120 (for example, which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (such as time resources, frequency resources, spatial resources, or other examples) may be shared between access links 415 and backhaul links 420. In some aspects, a backhaul link 420 may be a primary backhaul link or a secondary backhaul link (for example, a backup backhaul link). In some aspects, a secondary backhaul link may be used if a primary backhaul link fails, becomes congested, becomes overloaded, or other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

In an IAB deployment, an IAB node may hand over a UE from a first IAB donor CU to a second IAB donor CU. Handover messages may be delivered to the UE from the first IAB donor CU via an IAB parent DU associated with the first IAB donor CU, which may be referred to as a source path. The source path may be a connection path of one or more nodes (such as IAB nodes, IAB parents, IAB donors, or a combination thereof) along which the UE communicates with a first IAB donor CU prior to handover to a second IAB donor CU. However, the source path may suffer from reduced reliability and increased latency due to degraded coverage and channel conditions on the source path or due to a large quantity of UEs and other IAB nodes being served by the IAB parent DU. As a result, the handover messages directed to the UE may become delayed or dropped, which can cause delays in the handover.

Various aspects relate generally to handover command delivery via a target path in an integrated access and backhaul configuration. Some aspects more specifically relate to an IAB node serving a child node or a descendent node such as a UE or another IAB node. The child node or the descendent node may be handed over from a first IAB donor CU to a second IAB donor CU. As part of the handover, the IAB node may migrate a connection between a DU of the IAB node and the first IAB donor CU from a first IAB parent DU to a second IAB parent DU. The first IAB donor CU may transmit a handover command (or other types of handover communications) to the IAB node via a target path (or a portion thereof) prior to or during handover of the child node or the descendent node to the second IAB donor CU. The target path may be a connection path of one or more nodes (such as IAB nodes, IAB parents, IAB donors, or a combination thereof) along which the UE is to communicate with the second IAB donor CU after handover to the second IAB donor CU.

Particular aspects of the subject matter described in this disclosure can be implemented to realize one or more of the following potential advantages. In some examples, the described techniques can be used to provide handover commands and other handover messages to the child node or the descendent node via the target path as opposed to the source path. In this way, the handover commands and other handover messages may be provided to the child node or the descendent node such that the handover commands and other handover messages are not affected by degraded coverage and channel conditions on the source path. Instead, the handover commands and other handover messages may be provided on the more reliable target path, which decreases delays in the delivery of the handover commands and other handover messages, decreases the likelihood that the handover commands and other handover messages will be dropped, or decreases delays in the handover of the child node or the descendent node.

FIGS. 5A-5D are diagrams illustrating an example 500 associated with handover command delivery via a target path in an IAB configuration in accordance with the present disclosure. As shown in FIGS. 5A-5D, example 500 includes communication between various wireless communication devices, such as an IAB donor CU 502, an IAB donor CU 504, an IAB parent DU 506, an IAB parent DU 508, an IAB donor DU 510, an IAB node 512, and a child node 514 (or a descendent node). The wireless communication devices illustrated and described in connection with FIGS. 5A-5D may be included in a wireless network, such as wireless network 100 illustrated and described above in connection with FIG. 1.

The wireless communication devices illustrated and described in connection with FIGS. 5A-5D may be included in an IAB deployment, an IAB network, or an IAB configuration, such as the radio access network 330 or the radio access network 365 illustrated and described above in connection with FIG. 3, or the IAB network illustrated and describe above in connection with FIG. 4. In some aspects, the IAB deployment includes a different quantity of IAB nodes, a different quantity of IAB donors, a different quantity of child nodes, or a combination thereof than the quantities illustrated in FIGS. 5A-5D.

The IAB donor CU 502, the IAB donor CU 504, and the IAB donor DU 510 may each include a base station 110, an anchor base station 335, an IAB donor 405, or an apparatus 900 described below in connection with FIG. 9. The IAB parent DU 506 and the IAB parent DU 508 may include a base station 110, a non-anchor base station 345, an IAB node 410, or an apparatus 800 described below in connection with FIG. 8. In some examples, the IAB parent DU 506 and the IAB parent DU 508 are implemented by separate physical IAB nodes (for example, separate base stations 110, separate non-anchor base stations 345, or separate physical IAB nodes 410). In some other examples, the IAB parent DU 506 and the IAB parent DU 508 are implemented by the same physical IAB node (for example, the same base station 110, the same non-anchor base station 345, or the same physical IAB node 410). In various examples, the child node 514 (or the descendent node, which may include a child node of the child node 514) may include a UE 120, a base station 110, a non-anchor base station 345, an IAB node 410, or an apparatus 800. In various examples, the IAB parent DU 508 may be implemented by the IAB donor DU 510.

Figure 5A:
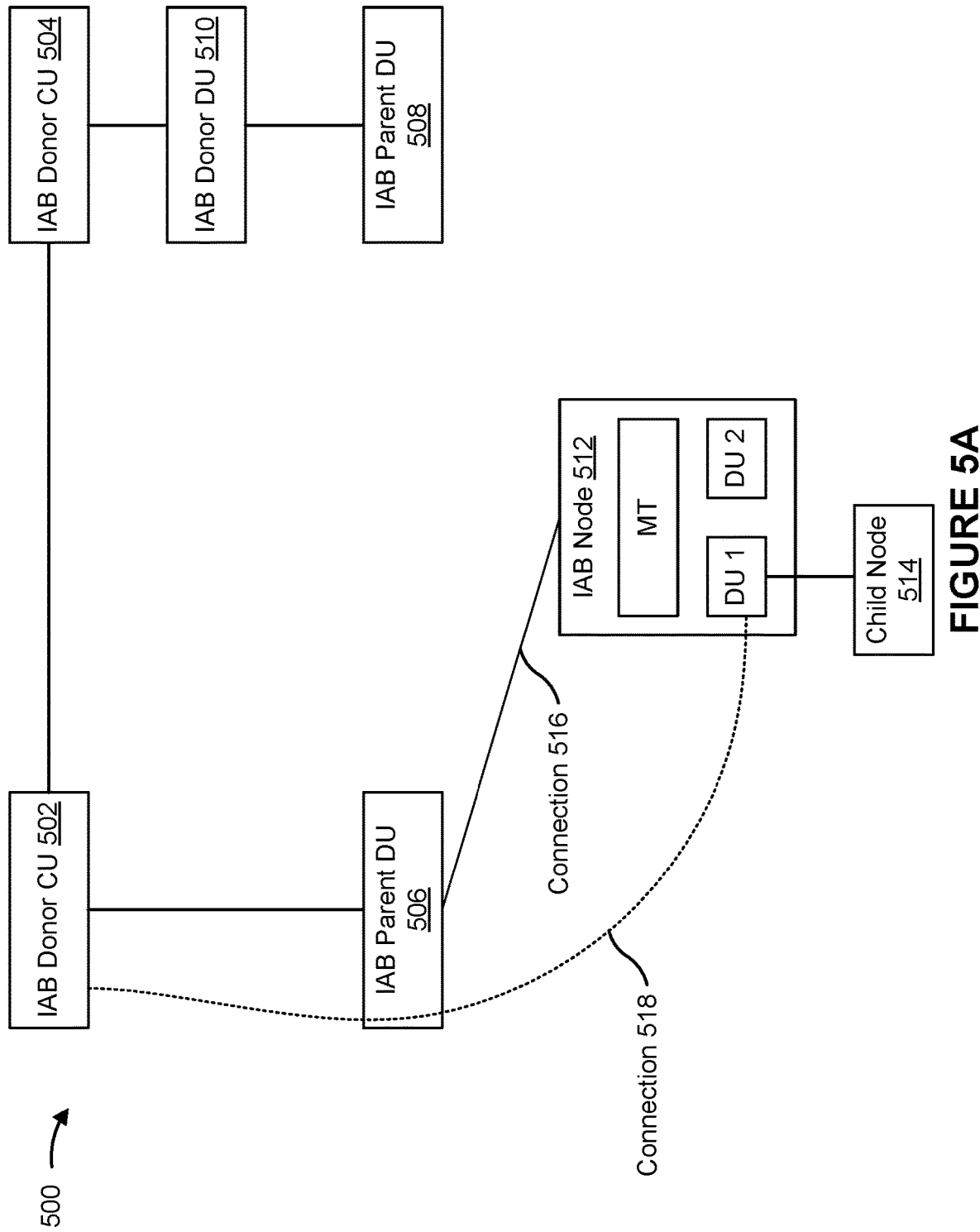
FIGS. 5A-5D are diagrams illustrating an example associated with handover command delivery via a target path in an IAB configuration in accordance with the present disclosure.

As shown in FIG. 5A, the IAB node 512 may include an MT and a plurality of DUs such as DU 1 and DU 2. DU 1 may be associated with IAB donor CU 502 and IAB parent DU 506, and DU 2 may be associated with IAB donor CU 504 and IAB parent DU 508. The IAB node 512 may serve one or more child nodes 514 from the plurality of DUs. For example, the IAB node 512 may serve child node 514 on DU 1, and may provide a source path to IAB donor CU 502 for the child node 514.

The IAB node 512 may be communicatively connected with IAB donor CU 502 via the IAB parent DU 506. The IAB node 512 may be communicatively connected with the IAB parent DU 506 by a connection 516, and may be communicatively connected with the IAB donor CU 502 by a connection 518. The connection 518 may include an RRC connection (for example, a connection on which RRC messages or communications are exchanged), an F1 control plane (F1-C) interface connection (for example, a connection on which F1AP messages are exchanged), or another type of connection. The source path between the IAB donor CU 502 and the child node 514 may include the connection 516 and the connection 518.

In some aspects, the IAB donor CU 502 may determine to hand over the child node 514 from the IAB donor CU 502 to the IAB donor CU 504. The handover of the child node 514 from the IAB donor CU 502 to the IAB donor CU 504 may include handing over the child node 514 from the DU 1 of the IAB node 512 to the DU 2 of the IAB node 512. Moreover, the handover of the child node 514 from the IAB donor CU 502 to the IAB donor CU 504 may include a handover or secondary node change from the IAB parent DU 506 to the IAB parent DU 508. The IAB donor CU 502 may determine to hand over the child node 514 based at least in part on mobility of the child node 514, based at least in part on mobility of the IAB node 512, based at least in part on degraded or worsening channel conditions or signal quality on the source path, or for other various factors.

Figure 5B:
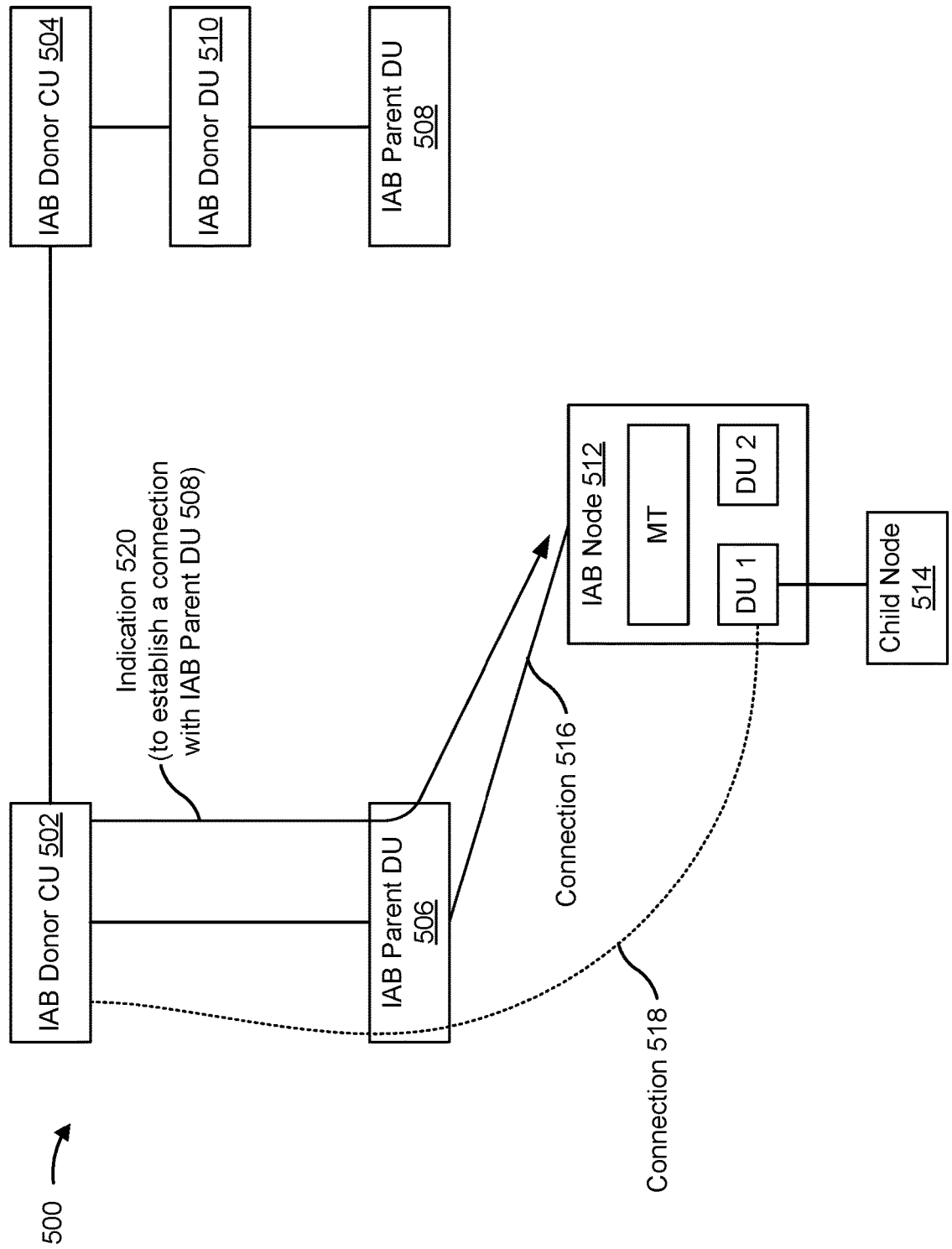

As shown in FIG. 5B, the IAB donor CU 502 may transmit an indication 520 to initiate the handover of the child node 514. The IAB donor CU 502 may transmit the indication 520 to the IAB node 512 on the source path (for example, via the connection 516 and the connection 518). Accordingly, the IAB node 512 may receive the indication 520 via the IAB parent DU 506. The indication 520 may include an indication for the IAB node 512 to establish a connection with the IAB parent DU 508.

Figure 5C:
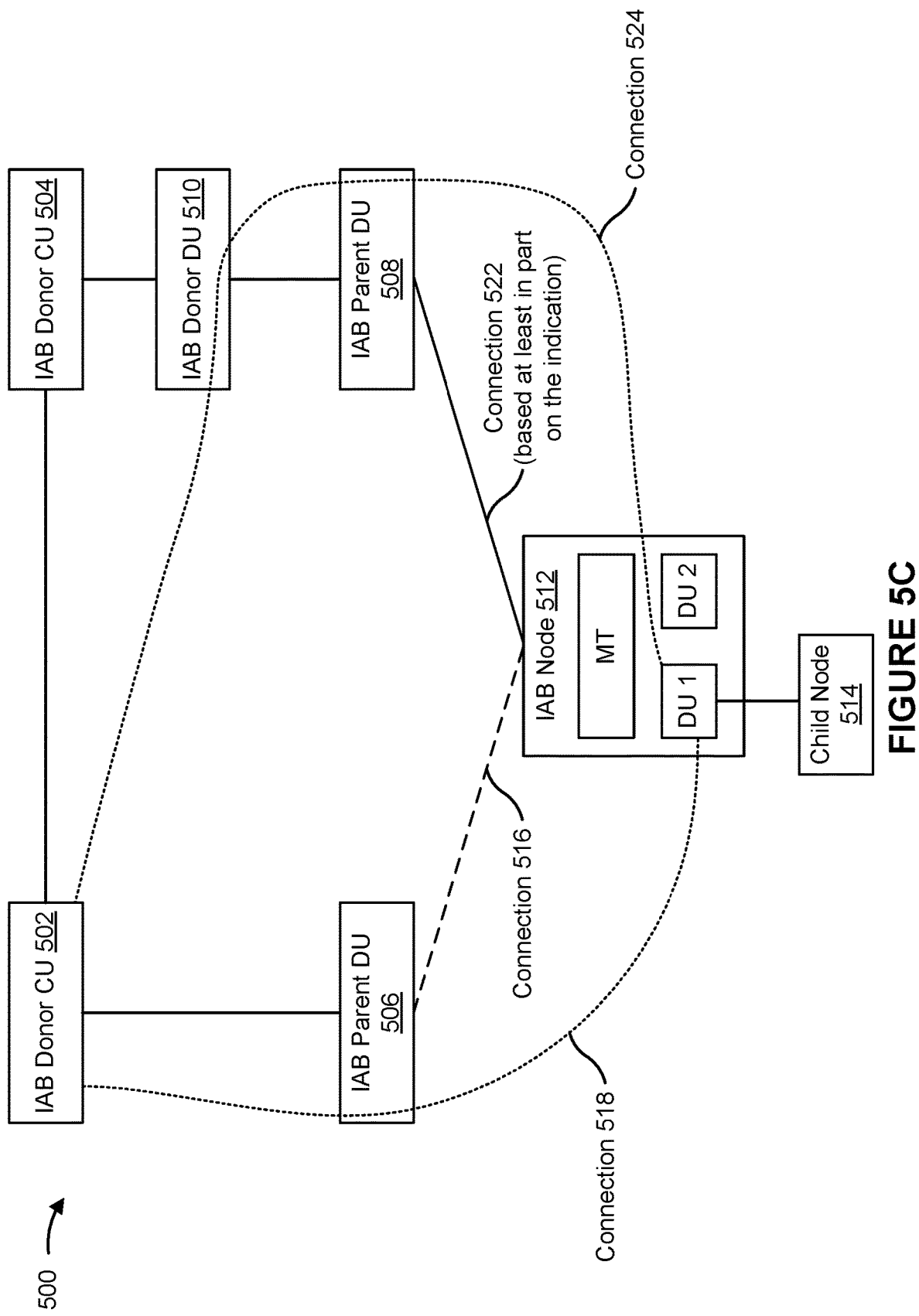

As shown in FIG. 5C, the IAB node 512 may establish connection 522 with the IAB parent DU 508. The IAB node 512 may establish the connection 522 based at least in part on receiving the indication 520 from the IAB donor CU 502 on the source path. In some aspects, the IAB node 512 releases the connection 516 with the IAB parent DU 506 based at least in part on establishing the connection 522 with the IAB parent DU 508. In some aspects, the IAB node 512 maintains the connection 516 with the IAB parent DU 506 after establishing the connection 522 with the IAB parent DU 508. In some aspects, the IAB node 512 may establish the connection 522 by performing a handover from the IAB parent DU 506 to the IAB parent DU 508. In some aspects, the IAB node 512 may establish the connection 522 by performing a secondary node change. The secondary node change may include transitioning from a primary backhaul link (a primary backhaul link 420 or the connection 516) to a secondary or backup backhaul link (a secondary or backup backhaul link 420 or the connection 522).

As further shown in FIG. 5C, the IAB node 512 may establish a connection 524 with the IAB donor CU 502. The connection 524 with the IAB donor CU 502 may be via the IAB parent DU 508, the IAB donor DU 510 associated with IAB donor CU 504, or a combination thereof. A target path for the handover of the child node 514 may include the connection 522 and the connection 524. The connection 524 may include an F1-C interface connection (for F1-C traffic), an RRC connection, an F1 user plane (F1-U) interface connection (for F1-U traffic), an F1-C UE-associated interface connection (for F1-C UE-associated traffic), an F1-C non-UE-associated interface connection (for F1-C non-UE-associated traffic), a non-F1 interface connection (for non-F1 traffic), or another type of signaling connection. In some aspects, the IAB node 512 releases the connection 518 with the IAB donor CU 502 based at least in part on establishing the connection 524 with the IAB donor CU 502. In some aspects, the IAB node 512 maintains the connection 518 with the IAB donor CU 502 after establishing the connection 524 with the IAB donor CU 502.

In some aspects, the IAB node 512 establishes the connection 524 with the IAB donor CU 502 based at least in part on receiving the indication 520. In some aspects, the IAB node 512 establishes the connection 524 with the IAB donor CU 502 based at least in part on establishing the connection 522 with the IAB parent DU 508. In some aspects, the IAB node 512 establishes the connection 524 with the IAB donor CU 502 based at least in part on receiving another indication from the IAB donor CU 502 or from the IAB donor CU 504 to establish the connection 524. In some aspects, the IAB node 512 establishes the connection 524 with the IAB donor CU 502 based at least in part on the IAB node 512 serving the child node 514 on the DU 1 and determining that the child node 514 is to be transferred or handed over to the DU 2.

In some aspects, the IAB node 512 may establish the connection 524 based at least in part on transport network layer (TNL) address information. The TNL address information may include Internet protocol (IP) address information, such as an IP address for the connection 524 or an IP prefix from which the IAB node 512 may determine the IP address for the connection 524. In some aspects, the IAB node 512 may receive the TNL address information from the IAB donor CU 502 and via the source path (for example, via the connection 516 and the connection 518). For example, the IAB node 512 may transmit a request for the TNL address information to the IAB donor CU 502 on the source path, and the IAB donor CU 502 may transmit the TNL address information to the IAB node 512 based at least in part on receiving the request.

In some aspects, the IAB donor CU 502 may transmit the TNL address information in the same message or communication in which the indication 520 was transmitted to the IAB node 512 or in a different message or communication. In some aspects, the IAB donor CU 502 may transmit the TNL address information to the IAB node 512 in implementations that are not related to or do not involve a handover of the IAB node 512 or the child node 514. In these examples, the IAB donor CU 502 may transmit the TNL address information to the IAB node 512, and the IAB node 512 may receive the TNL address information from the IAB donor CU 502, in an RRC communication or an F1-C interface communication via an F1-C interface.

In some aspects, the IAB donor CU 502 may determine the TNL address information based at least in part on other TNL address information received from the IAB donor CU 504. For example, the IAB donor CU 502 may transmit, to the IAB donor CU 504, an indication that the IAB node 512 is to establish the connection 524 with the IAB donor CU 502 via the IAB donor DU 510 associated with the IAB donor CU 504. The IAB donor CU 504 may receive the indication and may transmit the other IP address information to the IAB donor CU 502 based at least in part on receiving the indication. The IAB donor CU 502 may transmit the indication, and the IAB donor CU 504 may transmit the other TNL address information, on a backhaul interface such as an X2 or an Xn backhaul interface or another type of backhaul signaling interface. As another example, the IAB donor CU 504 may determine that IAB node 512 is to establish the connection 524 with the IAB donor CU 502 and may transmit the other TNL address information to the IAB donor CU 502 based at least in part on the determination.

In some aspects, (such as those not related to or that do not involve a handover of the IAB node 512 or the child node 514), the IAB donor CU 502 may transmit a request for the other TNL address information to the IAB donor CU 504. The IAB donor CU 504 may receive the request for the other TNL address information from the IAB donor CU 502 and may obtain the other TNL address information from the IAB donor DU 510 based at least in part on the request. The IAB donor CU 504 may transmit the other TNL address information to the IAB donor CU 502 based at least in part on obtaining the other TNL address information from the IAB donor DU 510. The IAB donor CU 502 may receive the other TNL address information and may determine or derive the TNL address information based at least in part on the other TNL address information, and may transmit the TNL address information to the IAB node 512.

The IAB donor CU 504 may obtain the other TNL address information from the IAB donor DU 510 by transmitting a request to the IAB donor DU 510 for the other TNL address information and receiving the other TNL address information from the IAB donor DU 510 based at least in part transmitting the request. In some aspects, the IAB donor CU 504 transmits the other TNL address information to the IAB donor CU 502 on the X2 or the Xn backhaul interface. In some aspects, the IAB donor CU 504 functions as a proxy for the IAB donor DU 510 and transmits the other TNL address information to the IAB donor CU 504 by establishing an F1-C interface connection with the IAB donor CU 502 and transmitting the other TNL address information over the F1-C interface connection.

Alternatively, as opposed to the IAB donor CU 504 transmitting the other TNL address information to the IAB donor CU 502, the IAB donor CU 504 may trigger, instruct, or transmit an indication to the IAB donor DU 510 to transmit the other TNL address information to the IAB donor CU 502. In these examples, the IAB donor CU 504 may transmit an indication to the IAB donor DU 510 and the IAB donor CU 502 to establish a connection such as a stream control transmission protocol (SCTP) connection or an F1-C interface connection. The IAB donor DU 510 and the IAB donor CU 502 may establish the connection based at least in part on the indication. The IAB donor CU 502 may transmit a request to the IAB donor DU 510 for the other TNL address information via the connection with the IAB donor DU 510. The IAB donor DU 510 may receive the request and may transmit the other TNL address information to the IAB donor CU 502. The IAB donor CU 502 may receive the other TNL address information from the IAB donor DU 510 via the connection.

The other TNL address information may include IP address information, such as an IP address, an IP prefix, a group of IP addresses, or a group of IP prefixes. In some aspects, the other TNL address information is the same as the TNL address information. In some aspects, the other TNL address information is different from the TNL address information. In some aspects, the IAB donor CU 502 or the IAB donor CU 504 determines or derives the other TNL address information based at least in part on an IP prefix associated with the IAB donor DU 510. In some aspects, the IAB donor CU 502 selects, determines, or identifies an IP address for the connection 524 from the group of IP addresses in the other TNL address information. In some aspects, the IAB donor CU 502 selects, determines, or identifies an IP prefix for the connection 524 from the group of IP prefixes in the other IP address information.

In some aspects, the IAB donor CU 502 determines or derives additional TNL address information (IP address information, an IP address, or an IP prefix, among other examples) for other nodes such as the child node 514 of the IAB node 512. The IAB donor CU 502 may transmit the additional TNL address information to the child node 514. The IAB donor CU 502 may communicate with the IAB node 512 via the connection 524 based at least in part on the TNL address information transmitted to the IAB node 512, and may communicate with the child node 514 via the connection 524 based at least in part on the additional TNL address information transmitted to the child node 514.

In some aspects, in addition to transmitting the indication on the backhaul interface, the IAB donor CU 502 may transmit load information associated with the connection 524 through the IAB donor DU 510. The load information may include a quantity of child nodes 514 associated with or connected with the IAB node 512, topology information associated with the IAB node (for example, information identifying a connection topology of the child nodes 514 associated with the IAB node 512, the grandchild nodes associated with the child nodes 514 of IAB node 512, and so on), context information associated with the child nodes 514 of the IAB node 512, or other types of load information, or a combination thereof. The IAB donor CU 502 may transmit the indication that the IAB node 512 is to establish the connection 524, the load information, and the request for the other IP address information in the same message or communication, or in different messages or communications. The IAB donor CU 504 may approve or reject the connection 524 through the IAB donor DU 510 (for example, based at least in part on the load information).

In addition to transmitting the other IP address information to the IAB donor CU 502, the IAB donor CU 504 may transmit a configuration of one or more backhaul radio link control (RLC) channels to carry traffic for the connection 524. In some aspects, the IAB donor CU 504 transmits the configuration based at least in part on receiving the indication that the IAB node 512 is to establish the connection 524, based at least in part on receiving the request for the other IP address information, based at least in part on receiving the load information, or a combination thereof. The configuration may identify a mapping between the traffic for the connection 524 and the one or more backhaul RLC channels.

In some aspects, the IAB node 512 may receive the IP address information from the IAB donor CU 504. In these examples, the IAB node 512 may establish a connection with the IAB donor CU 504 via the IAB parent DU 508 (which may be implemented by the IAB donor DU 510 or may be implemented by another IAB node), and may receive the IP address information from the IAB donor CU 504 via the connection with the IAB donor CU 504. In some aspects, the IAB donor CU 502 may transmit (via the source path that includes the connection 516 and the connection 518) an indication to the IAB node 512 to establish the connection with the IAB donor CU 504, and the IAB node 512 may establish the connection with the IAB donor CU 504 based at least in part on receiving the indication. The connection with the IAB donor CU 504 may include an F1-C interface connection, an RRC connection, or another type of signaling connection. The IAB node 512 may transmit a request for the IP address information to the IAB donor CU 504 via the connection with the IAB donor CU 504, and the IAB donor CU 504 may transmit the IP address information to the IAB node 512 based at least in part on receiving the request.

In some aspects, the IAB node 512 establishes the connection 524 by establishing a new SCTP connection with the IAB donor CU 502. In some aspects, the IAB node 512 establishes the connection 524 by establishing an alternative IP endpoint (for example, based at least in part on the IP address information, the IP address, or the IP prefix received from the IAB donor CU 502) for an existing SCTP connection with the IAB donor CU 502. Thus, the same SCTP connection can be used for the source path and the target path, where the source path and the target path are each associated with a different IP endpoint for the SCTP connection. In these examples, the IAB node 512 may transfer a TNL association from the source path onto the target path that includes the connection 524. The IAB node 512 may transfer the TNL association onto the target path by mapping the SCTP connection onto the target path for the alternative IP endpoint and by mapping an IP security (IPSec) tunnel associated with the SCTP connection onto the target path for the alterative IP endpoint.

Figure 5D:
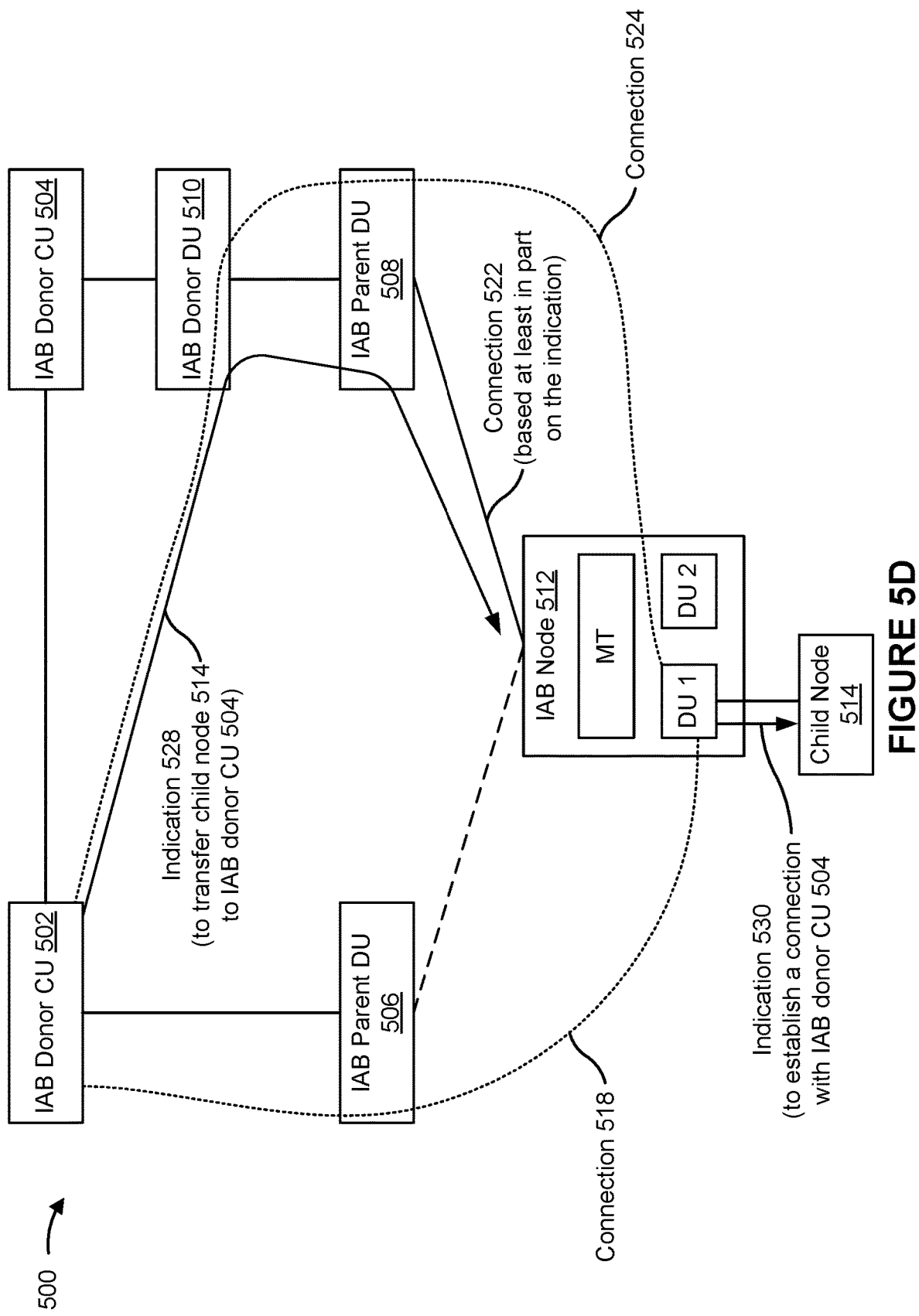

As shown in FIG. 5D, the IAB donor CU 502 may transmit an indication 528 on the target path to the IAB node 512. For example, the IAB donor CU 502 may transmit the indication 528 via the connection 522 and the connection 524 through the IAB parent DU 508, the IAB donor DU 510, or a combination thereof. The indication 528 may be a handover command, a handover message, or another type of handover communication that indicates the IAB node 512 is to transfer the child node 514 from the IAB donor CU 502 to the IAB donor CU 504.

As further shown in FIG. 5D, the IAB node 512 may transmit an indication 530 to the child node 514 via a connection between the child node 514 and the DU 1 of the IAB node 512. The indication 530 may include an indication for the child node 514 to establish a connection with the IAB donor CU 504 as part of the handover of the child node 514 to the IAB donor CU 504. The indication may be a handover command, a handover message, or another type of handover communication. Moreover, the IAB node 512 may switch a physical cell identifier (PCI) for the serving cell of the child node 514, an NR cell global identity (NCGI) associated with the serving cell, or a combination thereof from the IAB donor CU 502 to the IAB donor CU 504 as part of the handover.

In this way, the IAB donor CU 502 may provide handover commands and other handover messages to the child node 514 via the target path as opposed to the source path. The handover commands and other handover messages may be provided to the child node 514 via the target path such that the handover commands and other handover messages are not affected by degraded coverage and channel conditions on the source path. Instead, the handover commands and other handover messages may be provided on the more reliable target path, which decreases delays in the delivery of the handover commands and other handover messages, decreases the likelihood that the handover commands and other handover messages will be dropped, or decreases delays in the handover of the child node 514.

Figure 6:
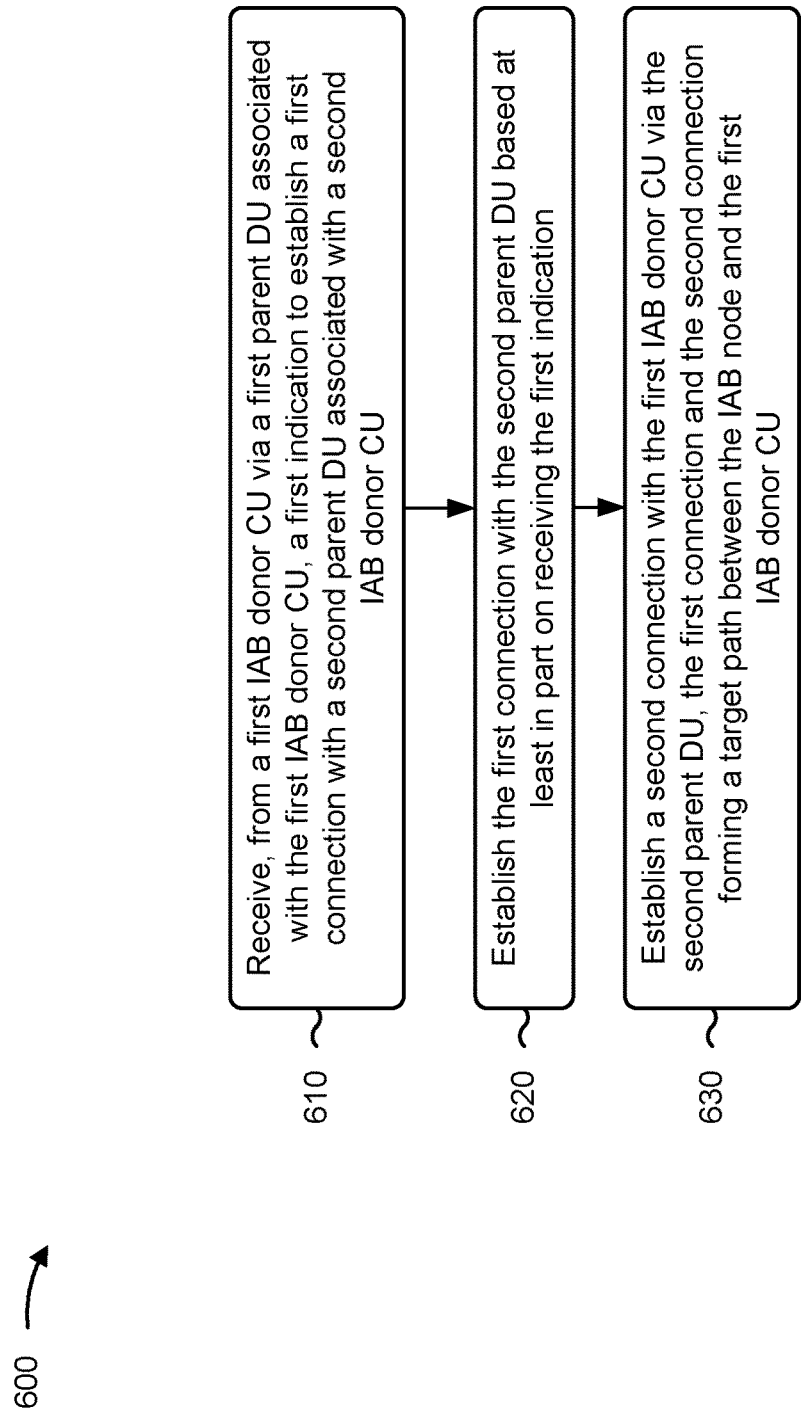
FIG. 6 is a flowchart illustrating an example process performed, for example, by an IAB node in accordance with the present disclosure.

FIG. 6 is a flowchart illustrating an example process 600 performed, for example, by an IAB node in accordance with the present disclosure. Example process 600 is an example where the IAB node (such as a base station 110, a non-anchor base station 345, an IAB node 410, or an IAB node 512, among other examples) performs operations associated with handover command delivery via a target path in an IAB configuration.

As shown in FIG. 6, in some aspects, process 600 may include receiving, from a first IAB donor CU via a first parent DU associated with the first IAB donor CU, a first indication to establish a first connection with a second parent DU associated with a second IAB donor CU (block 610). For example, the IAB node (using transmit processor 220, receive processor 238, controller/processor 240, memory 242, or another component) may receive, from a first IAB donor CU via a first parent DU associated with the first IAB donor CU, a first indication to establish a first connection with a second parent DU associated with a second IAB donor CU, as described above.

As further shown in FIG. 6, in some aspects, process 600 may include establishing the first connection with the second parent DU based at least in part on receiving the first indication (block 620). For example, the IAB node (using transmit processor 220, receive processor 238, controller/ processor 240, memory 242, or another component) may establish the first connection with the second parent DU based at least in part on receiving the first indication, as described above.

As further shown in FIG. 6, in some aspects, process 600 may include establishing a second connection with the first IAB donor CU via the second parent DU, the first connection and the second connection forming a target path between the IAB node and the first IAB donor CU (block 630). For example, the IAB node (using transmit processor 220, receive processor 238, controller/processor 240, memory 242, or another component) may establish a second connection with the first IAB donor CU via the second parent DU, the first connection and the second connection forming a target path between the IAB node and the first IAB donor CU, as described above.

Process 600 may include additional aspects, such as any single aspect or any combination of aspects described below or in connection with one or more other processes described elsewhere herein.

In a first aspect, establishing the second connection with the first IAB donor CU includes establishing the second connection with the first IAB donor CU via the second parent DU and an IAB donor DU associated with the second IAB donor CU. In a second additional aspect, alone or in combination with the first aspect, the second connection includes an F1-C interface connection, an F1-C UE-associated interface connection, an F1-C non-UE-associated interface connection, an F1-U interface connection, or a non-F1 interface connection. In a third additional aspect, alone or in combination with one or more of the first and second aspects, the first parent DU and the second parent DU are implemented by separate physical IAB nodes. In a fourth additional aspect, alone or in combination with one or more of the first through third aspects, the first parent DU and the second parent DU are implemented by a same physical IAB node.

In a fifth additional aspect, alone or in combination with one or more of the first through fourth aspects, establishing the first connection with the second parent DU includes performing a handover from the first parent DU to the second parent DU. In a sixth additional aspect, alone or in combination with one or more of the first through fifth aspects, establishing the first connection with the second parent DU includes performing a secondary node change from the first parent DU to the second parent DU. In a seventh additional aspect, alone or in combination with one or more of the first through sixth aspects, the child node is a UE or another IAB node. In an eighth additional aspect, alone or in combination with one or more of the first through seventh aspects, process 600 includes switching at least one of a PCI associated with a serving cell of the child node or an NCGI associated with the serving cell from the first IAB donor CU to the second IAB donor CU.

In a ninth additional aspect, alone or in combination with one or more of the first through eighth aspects, establishing the second connection with the first IAB donor CU includes establishing an SCTP connection with the first IAB donor CU. In a tenth additional aspect, alone or in combination with one or more of the first through ninth aspects, establishing the second connection with the first IAB donor CU includes establishing an alternative IP endpoint for an SCTP connection with the first IAB donor CU. In an eleventh additional aspect, alone or in combination with one or more of the first through tenth aspects, process 600 includes transferring a TNL association onto the target path, which includes mapping the SCTP connection and an IPSec tunnel associated with the SCTP connection onto the target path for the alternative IP endpoint.

In a twelfth additional aspect, alone or in combination with one or more of the first through eleventh aspects, establishing the second connection with the first IAB donor CU includes maintaining a fourth connection with the first IAB donor CU via the first parent DU. In a thirteenth additional aspect, alone or in combination with one or more of the first through twelfth aspects, establishing the first connection with the second parent DU includes maintaining a fourth connection with the first parent DU. In a fourteenth additional aspect, alone or in combination with one or more of the first through thirteenth aspects, establishing the second connection with the first IAB donor CU includes establishing the second connection based at least in part on serving the child node on a first IAB DU of the IAB node, where the child node is to be transferred from the first IAB DU to a second IAB DU of the IAB node.

In a fifteenth additional aspect, alone or in combination with one or more of the first through fourteenth aspects, establishing the second connection with the first IAB donor CU includes establishing the second connection based at least in part on receiving a third indication from the first IAB donor CU to establish the second connection. In a sixteenth additional aspect, alone or in combination with one or more of the first through fifteenth aspects, establishing the second connection with the first IAB donor CU includes establishing the second connection based at least in part on receiving a third indication from the second IAB donor CU to establish the second connection. In a seventeenth additional aspect, alone or in combination with one or more of the first through sixteenth aspects, process 600 includes receiving TNL address information, where establishing the second connection with the first IAB donor CU includes establishing the second connection based at least in part on the TNL address information.

In an eighteenth additional aspect, alone or in combination with one or more of the first through seventeenth aspects, receiving the TNL address information includes receiving the TNL address information in an RRC communication or an F1-C interface communication. In a nineteenth additional aspect, alone or in combination with one or more of the first through eighteenth aspects, process 600 includes communicating with the first IAB donor CU via the target path based at least in part on the TNL address information.

In twentieth additional aspect, alone or in combination with one or more of the first through nineteenth aspects, the TNL address information is received in a message that includes the first indication from the first IAB donor CU via the first parent DU. The message may be, for example, a handover command sent from the second IAB donor CU via the first IAB donor CU, for instance in an RRC container. Or, the second IAB donor CU may provide the first IAB-donor CU with TNL address information, whether for the child node or a descendant node of the child node, is using explicit signaling on an Xn interface or an X2 interface. In a twenty-first additional aspect, alone or in combination with one or more of the first through nineteenth aspects, process 600 includes transmitting a request for the TNL address information to the first IAB donor CU, where the TNL address information is received from the first IAB donor CU based at least in part on transmitting the request. In a twenty-second additional aspect, alone or in combination with one or more of the first through twenty-first aspects, receiving the TNL address information includes receiving the TNL address information from the second IAB donor CU via the fourth connection.

In a twenty-third additional aspect, alone or in combination with one or more of the first through twenty-second aspects, process 600 includes transmitting a request for the TNL address information to the second IAB donor CU, and where the TNL address information is received from the second IAB donor CU based at least in part on transmitting the request. In a twenty-fourth additional aspect, alone or in combination with one or more of the first through twenty-third aspects, the fourth connection includes an RRC connection or an F1-C interface connection. In a twenty-fifth additional aspect, alone or in combination with one or more of the first through twenty-fourth aspects, the TNL address information includes IP address information. In a twenty-sixth additional aspect, alone or in combination with one or more of the first through twenty-fifth aspects, the TNL address information includes an IP address. In a twenty-seventh additional aspect, alone or in combination with one or more of the first through twenty-sixth aspects, the TNL address information includes an IP prefix, and process 600 further includes determining an IP address for the second connection based at least in part on the IP prefix.

In a twenty-eighth additional aspect, alone or in combination with one or more of the first through twenty-seventh aspects, process 600 includes receiving, from the second IAB donor CU, a configuration of one or more backhaul RLC channels to carry traffic for the second connection. In a twenty-ninth additional aspect, alone or in combination with one or more of the first through twenty-eighth aspects, process 600 includes receiving, from the second IAB donor CU, an indication of a mapping between traffic for the second connection and one or more backhaul RLC channels.

In a thirtieth additional aspect, alone or in combination with one or more of the first through twenty-ninth aspects, the process 600 includes receiving, via the target path, a second indication to transfer a child node from the first IAB donor CU to the second IAB donor CU and transmitting a third indication to the child node for the child node to establish a third connection with the second IAB donor CU. In a thirty-first additional aspect, alone or in combination with one or more of the first through thirtieth aspects, establishing the first connection with the second parent DU includes performing a handover from the first parent DU to the second parent DU, performing a secondary node change from the first parent DU to the second parent DU, or re-establishing a fourth connection with the second parent DU.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
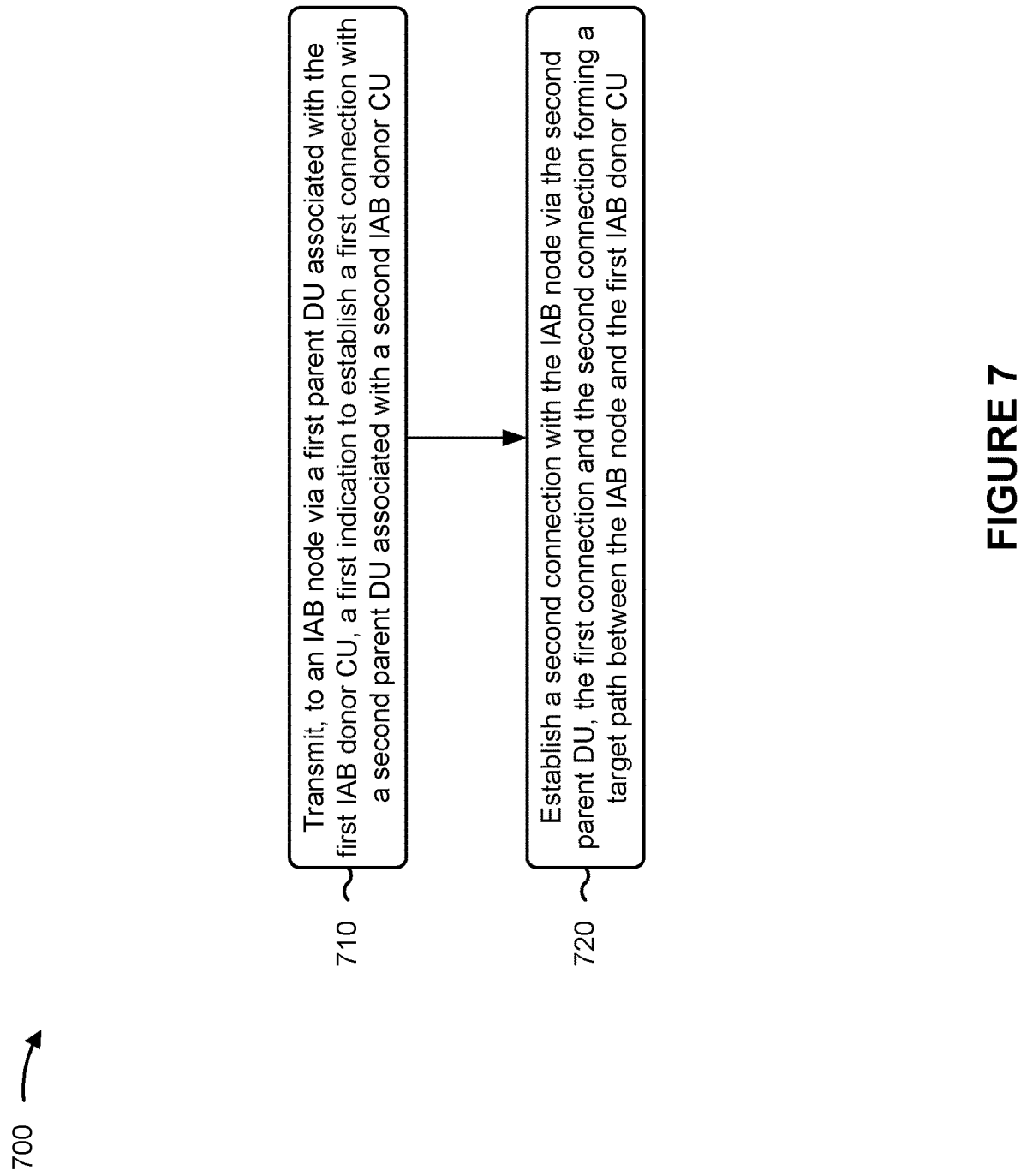
FIG. 7 is a flowchart illustrating an example process performed, for example, by an IAB donor centralized unit (CU) in accordance with the present disclosure.

FIG. 7 is a flowchart illustrating an example process 700 performed, for example, by a first IAB donor CU in accordance with the present disclosure. Example process 700 is an example where the first IAB donor CU (such as a base station 110, an anchor base station 335, an IAB donor 405, or an IAB donor CU 502, among other examples) performs operations associated with handover command delivery via a target path in an integrated IAB configuration.

As shown in FIG. 7, in some aspects, process 700 may include transmitting, to an IAB node via a first parent DU associated with the first IAB donor CU, a first indication to establish a first connection with a second parent DU associated with a second IAB donor CU (block 710). For example, the first IAB donor CU (using transmit processor 220, receive processor 238, controller/processor 240, memory 242, or another component) may transmit, to an IAB node via a first parent DU associated with the first IAB donor CU, a first indication to establish a first connection with a second parent DU associated with a second IAB donor CU, as described above.

As further shown in FIG. 7, in some aspects, process 700 may include establishing a second connection with the IAB node via the second parent DU, the first connection and the second connection forming a target path between the IAB node and the first IAB donor CU (block 720). For example, the first IAB donor CU (using transmit processor 220, receive processor 238, controller/processor 240, memory 242, or another component) may establish a second connection with the IAB node via the second parent DU, the first connection and the second connection forming a target path between the IAB node and the first IAB donor CU, as described above.

Process 700 may include additional aspects, such as any single aspect or any combination of aspects described below or in connection with one or more other processes described elsewhere herein.

In a first aspect, the second connection includes an F1-C interface connection, an F1-C UE-associated interface connection, an F1-C non-UE-associated interface connection, an F1 user plane (F1-U) interface connection, or a non-F1 interface connection. In a second additional aspect, alone or in combination with the first aspect, the first parent DU and the second parent DU are implemented by different physical IAB nodes. In a third additional aspect, alone or in combination with one or more of the first and second aspects, the first parent DU and the second parent DU are implemented by a same physical IAB node. In a fourth additional aspect, alone or in combination with one or more of the first through third aspects, process 700 includes transmitting first TNL address information to the IAB node and communicating with the IAB node via the target path based at least in part on the first TNL address information. In a fifth additional aspect, alone or in combination with one or more of the first through fourth aspects, transmitting the first TNL address information comprises transmitting the first TNL address information in an RRC communication or an F1 control plane (F1-C) interface communication.

In a sixth additional aspect, alone or in combination with one or more of the first through fifth aspects, transmitting the first TNL address information includes transmitting the first TNL address information in a message that includes the first indication. In a seventh additional aspect, alone or in combination with one or more of the first through sixth aspects, process 700 includes receiving a request for the first TNL address information from the IAB node, where the first TNL address information is transmitted to the IAB node based at least in part on transmitting the request. In an eighth additional aspect, alone or in combination with one or more of the first through seventh aspects, process 700 includes transmitting, to the second IAB donor CU, a third indication that the IAB node is to establish the second connection through an IAB donor DU associated with the second IAB donor CU, and receiving second TNL address information from the second IAB donor CU based at least in part on transmitting the third indication.

In an ninth additional aspect, alone or in combination with one or more of the first through eighth aspects, process 700 includes determining the first TNL address information based at least in part on the second TNL address information. In a tenth additional aspect, alone or in combination with one or more of the first through ninth aspects, the indication that the IAB node is to establish the second connection through the IAB donor DU is included in a request for the second TNL address information. In an eleventh additional aspect, alone or in combination with one or more of the first through tenth aspects, the second TNL address information includes an indication of IP address information. In a twelfth additional aspect, alone or in combination with one or more of the first through eleventh aspects, the second TNL address information includes an indication of an IP address. In a thirteenth additional aspect, alone or in combination with one or more of the first through twelfth aspects, the second TNL address information includes an indication of an IP prefix.

In a fourteenth additional aspect, alone or in combination with one or more of the first through thirteenth aspects, the second TNL address information is based at least in part on an IP prefix associated with the IAB donor DU. In a fifteenth additional aspect, alone or in combination with one or more of the first through fourteenth aspects, the first TNL address information and the second TNL address information are a same TNL address information. In a sixteenth additional aspect, alone or in combination with one or more of the first through fifteenth aspects, the second TNL address information is derived from the first TNL address information.

In a seventeenth additional aspect, alone or in combination with one or more of the first through sixteenth aspects, process 700 includes receiving, from the second IAB donor CU, an indication that the second IAB donor CU rejects the second connection through the IAB donor DU. In an eighteenth additional aspect, alone or in combination with one or more of the first through seventeenth aspects, process 700 includes transmitting, to the second IAB donor CU, load information associated with the second connection through the IAB donor DU, the load information including at least one of a quantity of child nodes associated with the IAB node, topology information associated with IAB node, or context information associated with a child node or a descendent node of the IAB node.

In a nineteenth additional aspect, alone or in combination with one or more of the first through eighteenth aspects, receiving the second TNL address information from the second IAB donor CU includes receiving the second TNL address information from the second IAB donor CU over an Xn or X2 base station interface. In a twentieth additional aspect, alone or in combination with one or more of the first through nineteenth aspects, process 700 includes transmitting first TNL address information to at least one of a child node or a descendent node of the IAB node, and communicating with the child node or the descendent node via the target path based at least in part on the TNL address information. In a twenty-first additional aspect, alone or in combination with one or more of the first through twentieth aspects, process 700 includes transmitting, to the second IAB donor CU, a request for second TNL address information, receiving the second TNL address information from the second IAB donor CU based at least in part on transmitting the request, and determining the first TNL address information based at least in part on the second TNL address information.

In a twenty-second additional aspect, alone or in combination with one or more of the first through twenty-first aspects, process 700 includes transmitting, to the second IAB donor CU, a third indication that the IAB node is to establish the second connection through an IAB donor DU associated with the second IAB donor CU, receiving, from the IAB donor DU based at least in part on the third indication, a first request to establish a third connection between the first IAB donor CU and the IAB donor DU, establishing the third connection based at least in part on receiving the first request, transmitting, to the IAB donor DU via the third connection, a request for second TNL address information, receiving the second TNL address information from the IAB donor DU based at least in part on the second request, and determining the first TNL address information based at least in part on the second TNL address information.

In a twenty-third additional aspect, alone or in combination with one or more of the first through twenty-second aspects, the third connection includes an SCTP connection or an F1-C interface connection. In a twenty-fourth additional aspect, alone or in combination with one or more of the first through twenty-third aspects, receiving the second TNL address information from the second IAB donor CU comprises receiving the second TNL address information from the second IAB donor CU over an F1-C interface connection. In a twenty-fifth additional aspect, alone or in combination with one or more of the first through twenty-fourth aspects, process 700 includes transmitting, to the IAB node via the target path, a second indication to transfer a child node of the IAB node from the first IAB donor CU to the second IAB donor CU.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
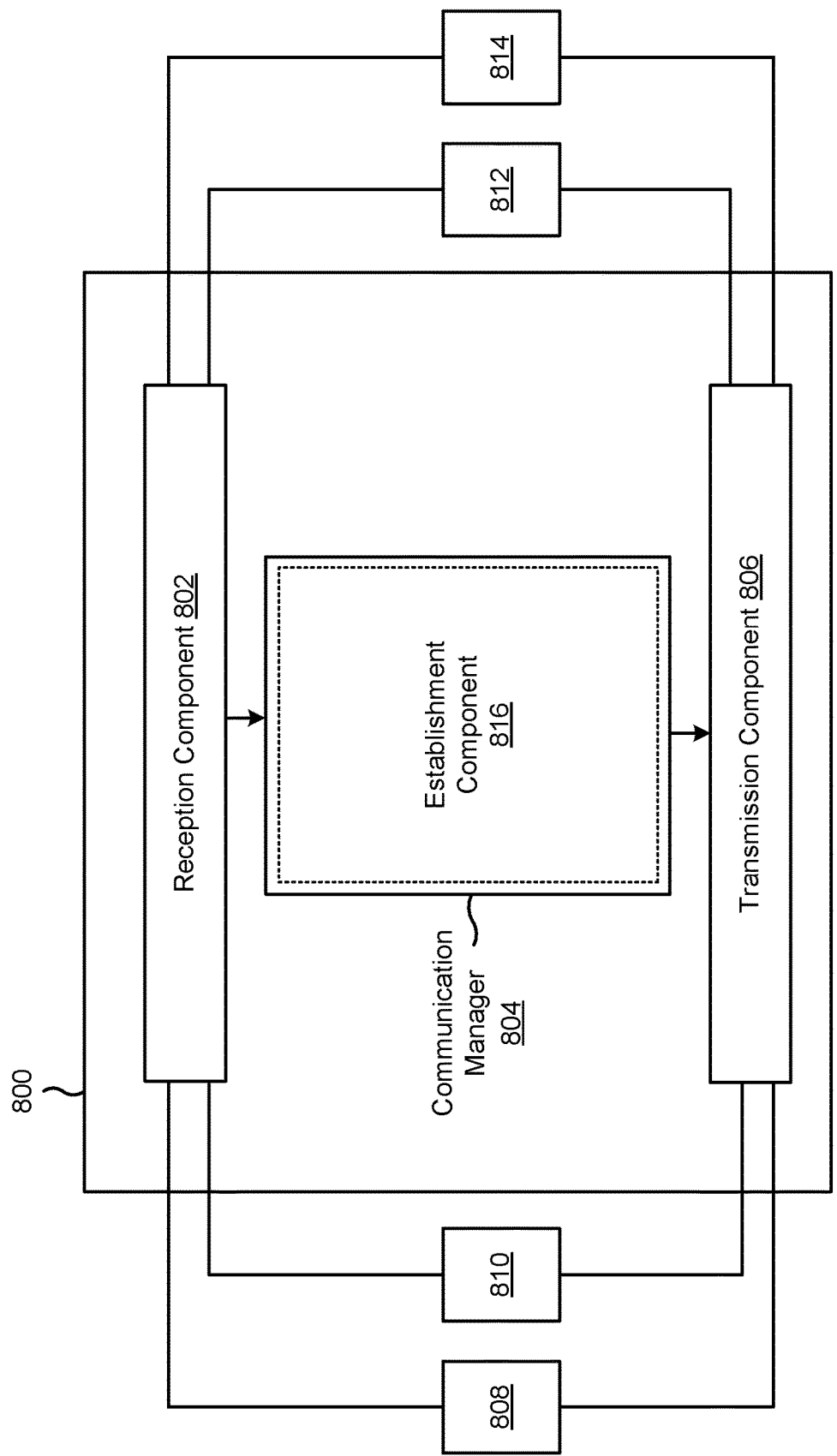
FIGS. 8 and 9 are block diagrams of example apparatuses for wireless communication in accordance with the present disclosure.

FIG. 8 is a block diagram of an example apparatus 800 for wireless communication in accordance with the present disclosure. In some aspects, the apparatus 800 may be a base station 110, a non-anchor base station 345, an IAB node 410, or an IAB node 512. In some aspects, a base station 110, a non-anchor base station 345, an IAB node 410, or an IAB node 512 may include the apparatus 800. In some aspects, the apparatus 800 includes a reception component 802, a communication manager 804, and a transmission component 806, which may be in communication with one another (for example, via one or more buses). As shown, the apparatus 800 may communicate with one or more other apparatuses 808-814 (such as a UE 120, a base station 110, an anchor base station 335, a non-anchor base station 345, an IAB donor 405, an IAB node 410, an IAB donor CU 502, an IAB parent DU 506, an IAB parent DU 508, an IAB donor DU 510, a child node 514, or another type of wireless communication device) using the reception component 802 and the transmission component 806.

In some aspects, the apparatus 800 may be configured to perform one or more operations described herein in connection with FIGS. 5A-5D. Additionally or alternatively, the apparatus 800 may be configured to perform process 600 of FIG. 6. In some aspects, the apparatus 800 may include one or more components of the base station 110 described above in connection with FIG. 2.

The reception component 802 may receive communications, such as reference signals, control information, data communications, or a combination thereof, from one or more of the apparatuses 808-814. The reception component 802 may receive communications on an access link, on a backhaul link, on a sidelink, or a combination thereof. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the base station 110 described above in connection with FIG. 2.

The transmission component 806 may transmit communications, such as reference signals, control information, data communications, or a combination thereof, to one or more of the apparatuses 808-814. The transmission component 806 may transmit communications on an access link, on a backhaul link, on a sidelink, or a combination thereof. In some aspects, the communication manager 804 may generate communications and may transmit the generated communications to the transmission component 806 for transmission to one or more of the apparatuses 808-814. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to one or more of the apparatuses 808-814. In some aspects, the transmission component 806 may include one or more antennas, a modulator, a transmit MIMO processor, a transmit processor, a controller/processor, a memory, or a combination thereof, of the base station 110 described above in connection with FIG. 2. In some aspects, the transmission component 806 may be collocated with the reception component 802 in a transceiver.

The communication manager 804 may receive (or may cause the reception component 802 to receive), from the apparatus 808 via the apparatus 810 associated with the apparatus 808, a first indication to establish a first connection with the apparatus 812 associated with an IAB donor CU. The communication manager 804 may establish the first connection with the apparatus 812 based at least in part on receiving the first indication. The communication manager 804 may establish a second connection with the apparatus 808 via the apparatus 812. The first connection and the second connection may form a target path between the apparatus 800 and the apparatus 808. The communication manager 804 may receive (or may cause the reception component 802 to receive), via the target path, a second indication to transfer the apparatus 814 from the apparatus 808 to the IAB donor CU. The communication manager 804 may transmit (or may cause transmission component 806 to transmit) a third indication to the apparatus 814 to establish a third connection with the IAB donor CU.

In some aspects, the communication manager 804 may include a set of components, such as an establishment component 816. Alternatively, the set of components may be separate and distinct from the communication manager 804. In some aspects, one or more components of the set of components may include or may be implemented within a controller/processor, a memory, a scheduler, a communication unit, or a combination thereof, of the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The establishment component 816 may establish the first connection with the apparatus 812. The establishment component 816 may establish the second connection with the apparatus 808 via the apparatus 812. The establishment component 816 may establish the second connection via an IAB donor DU associated with the IAB donor CU. The establishment component 816 may establish the first connection by performing a handover from the apparatus 810 to the apparatus 812. The establishment component 816 may establish the second connection by establishing an SCTP connection with the apparatus 808. The establishment component 816 may establish the second connection by establishing an alternative IP endpoint for an SCTP connection with the apparatus 808.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
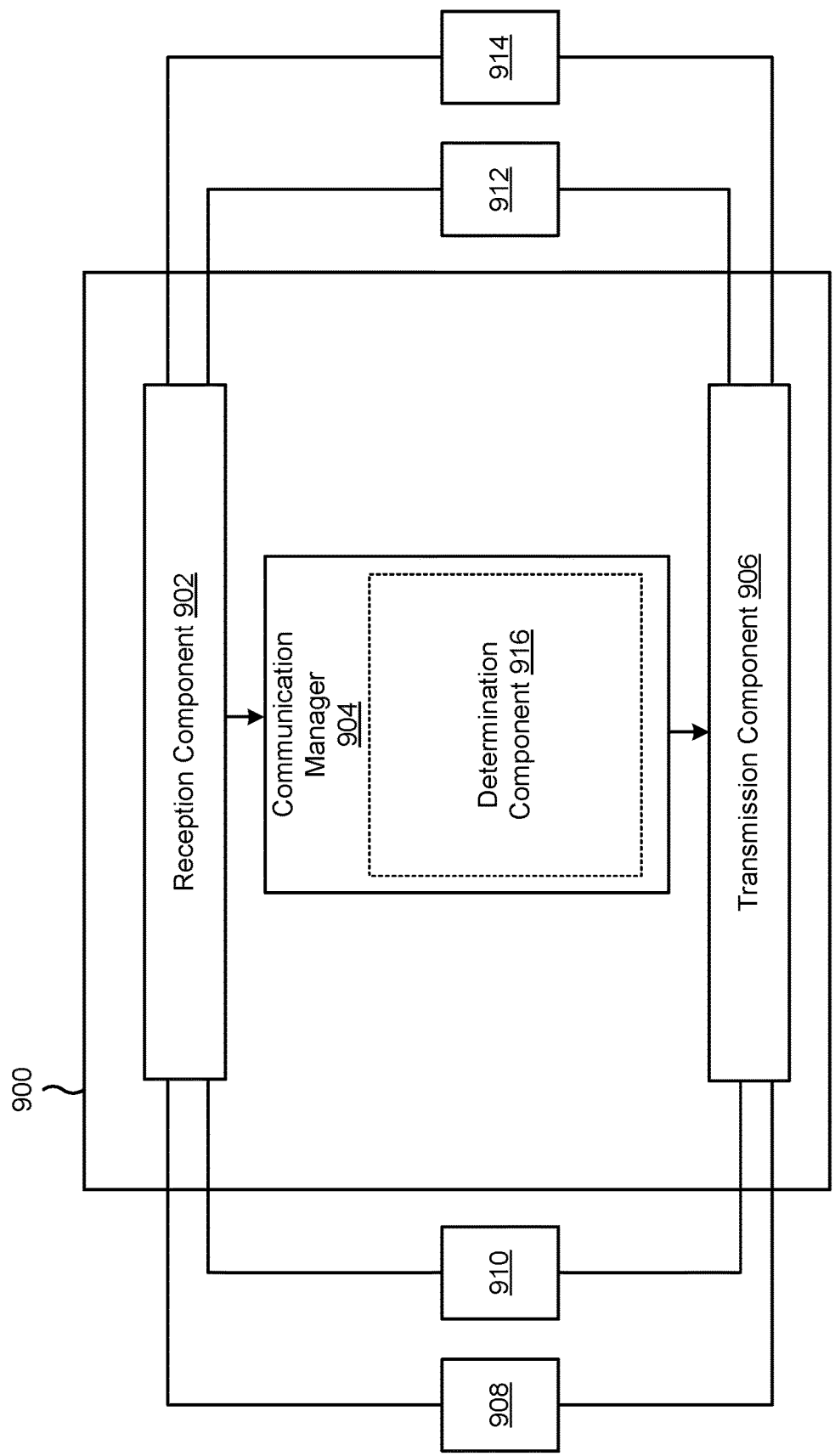

FIG. 9 is a block diagram of an example apparatus 900 for wireless communication in accordance with the present disclosure. In some aspects, the apparatus 900 is a base station 110, an anchor base station 335, an IAB donor 405, or an IAB donor CU 502. In some aspects, a base station 110, an anchor base station 335, an IAB donor 405, or an IAB donor CU 502 may include the apparatus 900. In some aspects, the apparatus 900 includes a reception component 902, a communication manager 904, and a transmission component 906, which may be in communication with one another (for example, via one or more buses). As shown, the apparatus 900 may communicate with one or more other apparatuses 908-914 (such as a UE 120, a base station 110, an anchor base station 335, a non-anchor base station 345, an IAB donor 405, an IAB node 410, an IAB donor CU 504, an IAB parent DU 506, an IAB parent DU 508, an IAB donor DU 510, a child node 514, or another type of wireless communication device) using the reception component 902 and the transmission component 906.

In some aspects, the apparatus 900 may be configured to perform one or more operations described herein in connection with FIGS. 5A-5D. Additionally or alternatively, the apparatus 900 may be configured to perform process 700 of FIG. 7, process 1100 of FIG. 11, or a combination thereof. In some aspects, the apparatus 900 may include one or more components of the base station 110 described above in connection with FIG. 2.

The reception component 902 may receive communications, such as reference signals, control information, data communications, or a combination thereof, from one or more of the apparatuses 908-914. The reception component 902 may receive communications on an access link, on a backhaul link, on a sidelink, or a combination thereof. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station 110 described above in connection with FIG. 2.

The transmission component 906 may transmit communications, such as reference signals, control information, data communications, or a combination thereof, to one or more of the apparatuses 908-914. The transmission component 906 may transmit communications on an access link, on a backhaul link, on a sidelink, or a combination thereof. In some aspects, the communication manager 904 may generate communications and may transmit the generated communications to the transmission component 906 for transmission to one or more of the apparatuses 908-914. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to one or more of the apparatuses 908-914. In some aspects, the transmission component 906 may include one or more antennas, a modulator, a transmit MIMO processor, a transmit processor, a controller/processor, a memory, or a combination thereof, of the base station 110 described above in connection with FIG. 2. In some aspects, the transmission component 906 may be collocated with the reception component 902 in a transceiver.

The communication manager 904 may transmit (or may cause the transmission component 906 to transmit), to the apparatus 908 via the apparatus 910 associated with the apparatus 912, a first indication to establish a first connection with the apparatus 914 associated with an IAB donor CU. The communication manager 904 may establish (or may cause the reception component 902, the transmission component 906, or a combination thereof to establish) a second connection with the IAB node via the second parent DU, the first connection and the second connection forming a target path. The target path may include the first connection and a second connection between the apparatus 908 and the apparatus 900 via the apparatus 914.

The communication manager 904 may transmit (or may cause the transmission component 906 to transmit), to the IAB donor CU, a request for first TNL address information for a connection between the first IAB donor CU and the apparatus 908. The connection may be via the apparatus 914 associated with the IAB donor CU. The communication manager 904 may receive (or may cause the reception component 902 to receive) the first TNL address information from the IAB donor CU based at least in part on transmitting the request. The communication manager 904 may determine second TNL address information based at least in part on the first TNL address information. The communication manager 904 may transmit (or may cause the transmission component 906 to transmit), to the apparatus 908, the second TNL address information.

In some aspects, the communication manager 904 may determine third TNL address information, for a child node of the apparatus 908, based at least in part on the first TNL address information. In some aspects, the communication manager 904 may transmit (or may cause the transmission component 906 to transmit) the third TNL address information to the child node. In some aspects, the connection may be via the apparatus 914 associated with the IAB donor CU.

In some aspects, the communication manager 904 may receive (or may cause the reception component 902 to receive), from the apparatus 914, a request to establish a connection between the apparatus 900 and the apparatus 914, and may establish the connection with the apparatus 914 based at least in part on the request. In some aspects, the communication manager 904 may transmit (or may cause the transmission component 906 to transmit), to the apparatus 914 via the connection, a request for the first TNL address information. In some aspects, the communication manager 904 may receive (or may cause the reception component 902 to receive), from the apparatus 914, the second TNL address information based at least in part on the request.

In some aspects, the communication manager 904 may include a set of components such as a determination component 916. Alternatively, the set of components may be separate and distinct from the communication manager 904. In some aspects, one or more components of the set of components may include or may be implemented within a controller/processor, a memory, a scheduler, a communication unit, or a combination thereof, of the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the determination component 916 may determine the second TNL address information, the third TNL address information, or a combination thereof, based at least in part on a the first TNL address information. In some aspects, the determination component 916 may include a receive processor, a transmit processor, a controller/processor, a memory, or a combination there of the base station 110 of FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
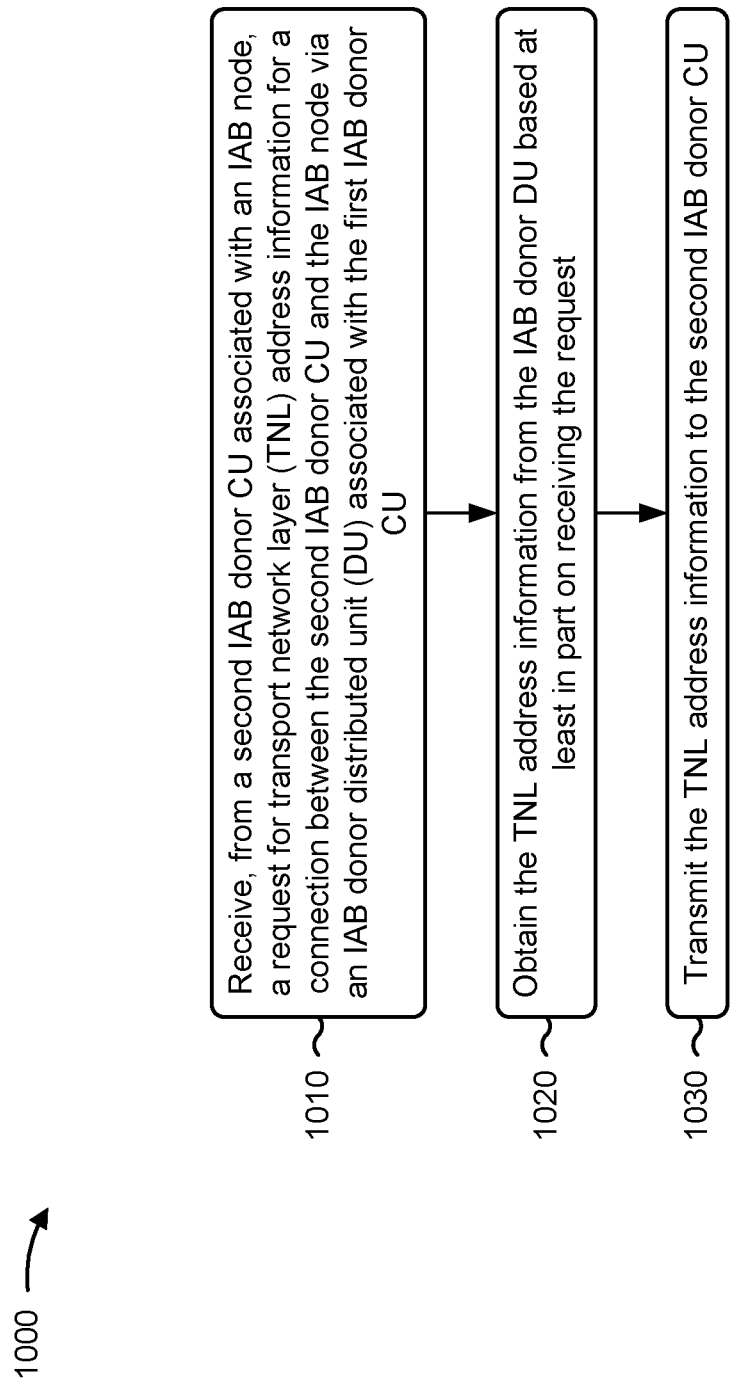
FIGS. 10 and 11 are flowcharts illustrating example processes performed, for example, by an IAB donor CU in accordance with the present disclosure.

FIG. 10 is a flowchart illustrating an example process 1000 performed, for example, by a first IAB donor CU in accordance with the present disclosure. Example process 1000 is an example where the first IAB donor CU (such as a base station 110, an anchor base station 335, an IAB donor 405, or an IAB donor CU 504, among other examples) performs operations associated with TNL address information configuration in an IAB configuration.

As shown in FIG. 10, in some aspects, process 1000 may include receiving, from a second IAB donor CU associated with an IAB node, a request for TNL address information for a connection between the second IAB donor CU and the IAB node via an IAB donor DU associated with the first IAB donor CU (block 1010). For example, the first IAB donor CU (using receive processor 238, controller/processor 240, memory 242, or another component) may receive, from a second IAB donor CU associated with an IAB node, a request for TNL address information for a connection between the second IAB donor CU and the IAB node via an IAB donor DU associated with the first IAB donor CU, as described above.

As further shown in FIG. 10, in some aspects, process 1000 may include obtaining the TNL address information from the IAB donor DU based at least in part on receiving the request (block 1020). For example, the first IAB donor CU (using transmit processor 220, receive processor 238, controller/processor 240, memory 242, or another component) may obtain the TNL address information from the IAB donor DU based at least in part on receiving the request, as described above.

As further shown in FIG. 10, in some aspects, process 1000 may include transmitting the TNL address information to the second IAB donor CU (block 1030). For example, the first IAB donor CU (using transmit processor 220, receive processor 238, controller/processor 240, memory 242, or another component) may transmit the TNL address information to the second IAB donor CU, as described above.

Process 1000 may include additional aspects, such as any single aspect or any combination of aspects described below or in connection with one or more other processes described elsewhere herein.

In a first additional aspect, obtaining the TNL address information from the IAB donor DU includes transmitting a second request for the TNL address information to the IAB donor DU, and receiving the TNL address information from the IAB donor DU based at least in part on receiving the second request. In a second additional aspect, alone or in combination with the first aspect, transmitting the TNL address information to the second IAB donor CU includes transmitting the TNL address information to the second IAB donor CU over an Xn or X2 base station interface. In a third additional aspect, alone or in combination with one or more of the first and second aspects, process 1000 includes establishing an F1-C interface connection with the second IAB donor CU, and transmitting the TNL address information to the second IAB donor CU over the F1-C interface connection.

In a fourth additional aspect, alone or in combination with one or more of the first through third aspects, the TNL address information includes IP address information. In a fifth additional aspect, alone or in combination with one or more of the first through fourth aspects, the TNL address information includes an indication of an IP address. In a sixth additional aspect, alone or in combination with one or more of the first through fifth aspects, the TNL address information includes an indication of an IP prefix.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
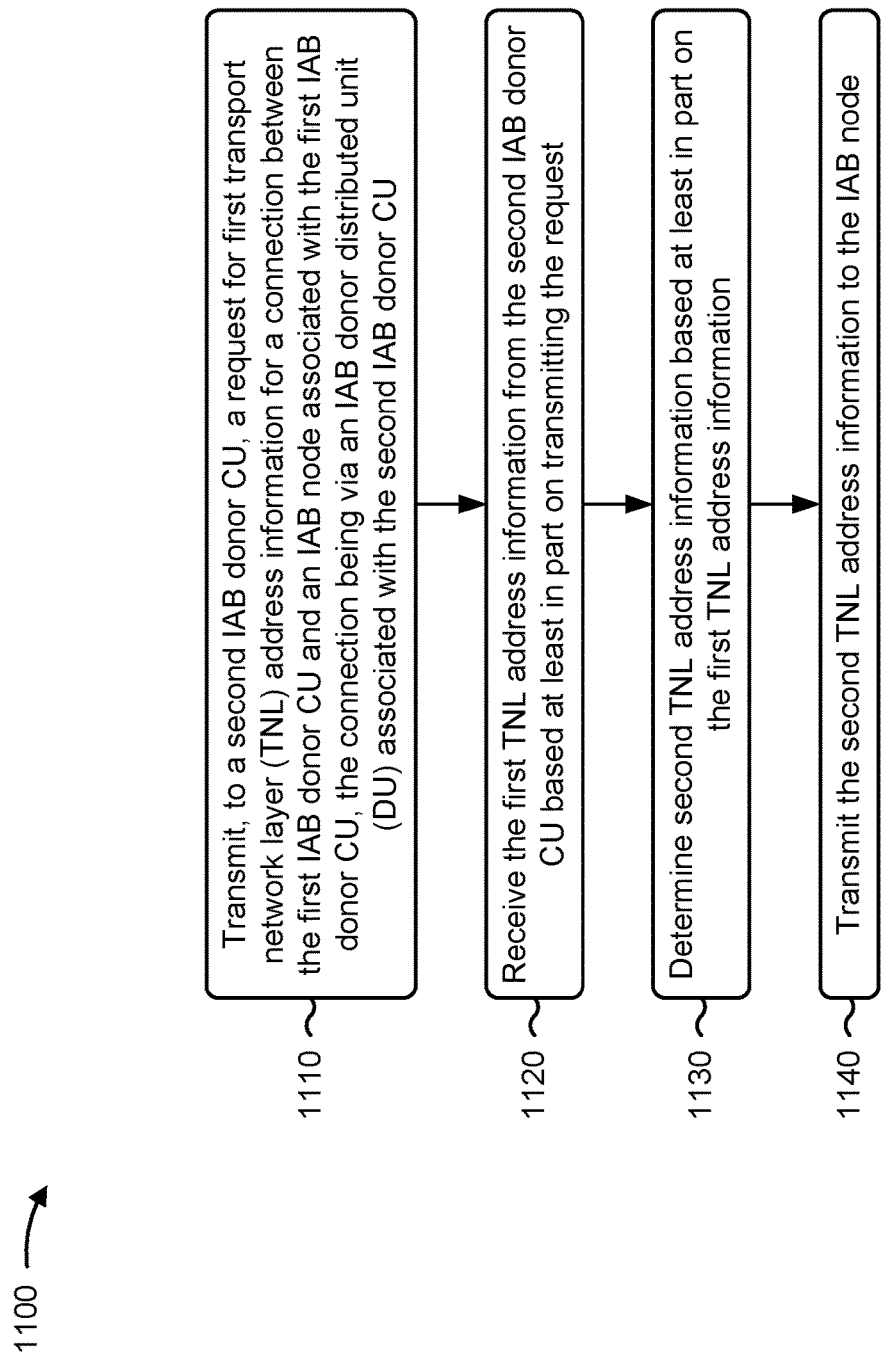

FIG. 11 is a flowchart illustrating an example process 1100 performed, for example, by a first IAB donor CU in accordance with the present disclosure. Example process 1000 is an example where the first IAB donor CU (such as a base station 110, an anchor base station 335, an IAB donor 405, or an IAB donor CU 502, among other examples) performs operations associated with TNL address information configuration in an IAB configuration.

As shown in FIG. 11, in some aspects, process 1100 may include transmitting, to a second IAB donor CU, a request for first TNL address information for a connection between the first IAB donor CU and an IAB node associated with the first IAB donor CU, the connection being via an IAB donor DU associated with the second IAB donor CU (block 1110). For example, the first IAB donor CU (using transmit processor 220, controller/processor 240, memory 242, or another component) may transmit, to a second IAB donor CU, a request for first TNL address information for a connection between the first IAB donor CU and an IAB node associated with the first IAB donor CU, the connection being via an IAB donor DU associated with the second IAB donor CU, as described above.

As further shown in FIG. 11, in some aspects, process 1100 may include receiving the first TNL address information from the second IAB donor CU based at least in part on transmitting the request (block 1120). For example, the first IAB donor CU (using receive processor 238, controller/processor 240, memory 242, or another component) may receive the first TNL address information from the second IAB donor CU based at least in part on transmitting the request, as described above.

As further shown in FIG. 11, in some aspects, process 1100 may include determining second TNL address information based at least in part on the first TNL address information (block 1130). For example, the first IAB donor CU (using transmit processor 220, receive processor 238, controller/processor 240, memory 242, or another component) may determine second TNL address information based at least in part on the first TNL address information, as described above.

As further shown in FIG. 11, in some aspects, process 1100 may include transmitting the second TNL address information to the IAB node (block 1140). For example, the first integrated access (using transmit processor 220, controller/processor 240, memory 242, or another component) may transmit the second TNL address information to the IAB node, as described above.

Process 1100 may include additional aspects, such as any single aspect or any combination of aspects described above or in connection with one or more other processes described elsewhere herein.

Figure 12:
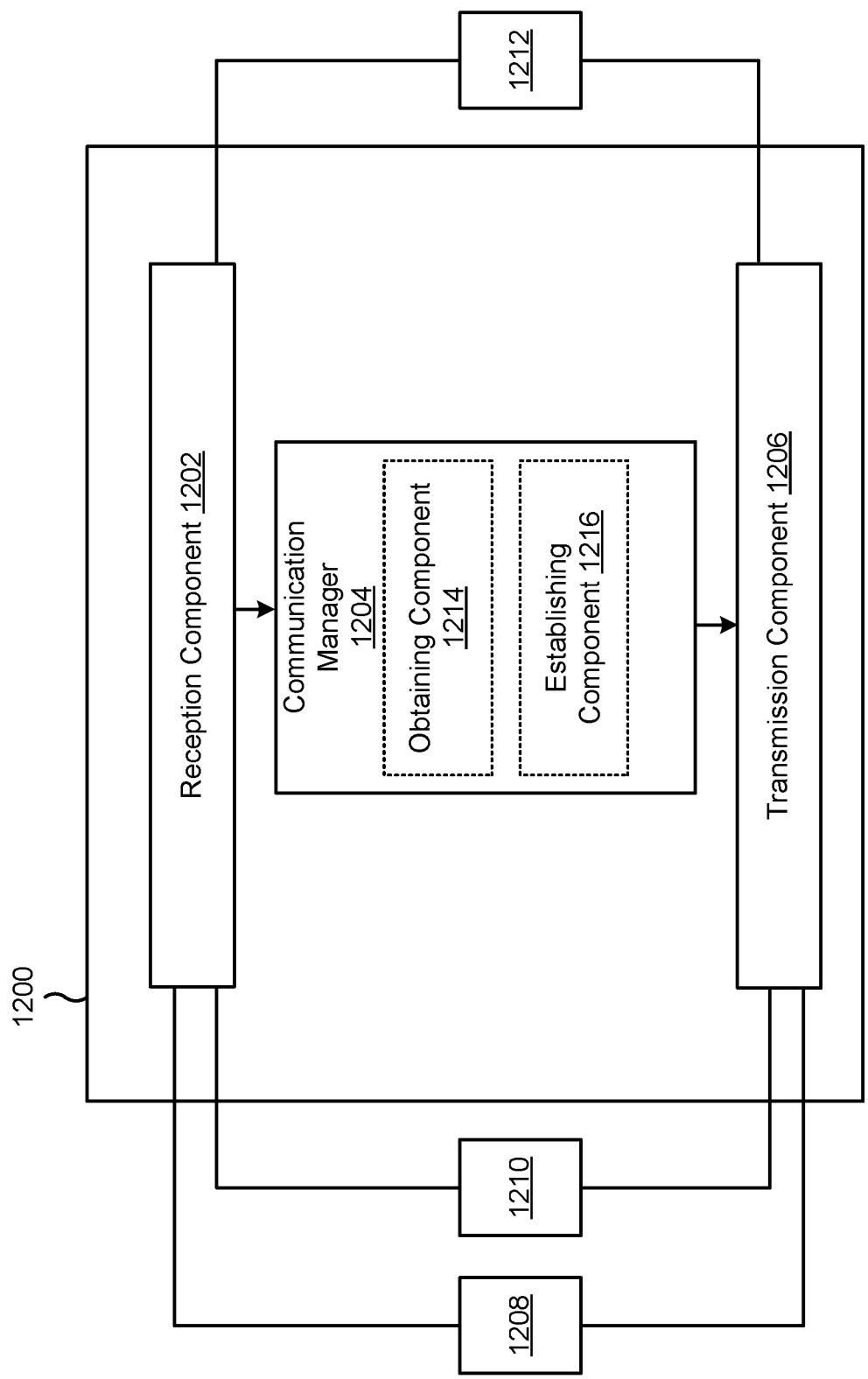
FIG. 12 is a block diagram of example apparatus for wireless communication in accordance with the present disclosure.

FIG. 12 is a block diagram of an example apparatus 1200 for wireless communication in accordance with the present disclosure. The apparatus 1200 may be a IAB donor CU, or a IAB donor CU may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 5A-5D. Additionally or alternatively, the apparatus 1200 may be configured to perform one or more processes described herein, such as process 1000 of FIG. 10. In some aspects, the apparatus 1200 may include one or more components of the IAB donor CU described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the IAB donor CU described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the IAB donor CU described above in connection with FIG. 2. In some aspects, the transmission component 1206 may be co-located with the reception component 1202 in a transceiver.

The communication manager 1204 may receive or may cause the reception component 1202 to receive, from the apparatus 1208 associated with the apparatus 1210, a request for TNL address information for a connection between the apparatus 1208 and the apparatus 1210 via apparatus 1212 associated with the apparatus 1200. The communication manager 1204 may obtain the TNL address information from the apparatus 1212 based at least in part on receiving the request. The communication manager 1204 may transmit or may cause the transmission component 1206 to transmit the TNL address information to the apparatus 1208. In some aspects, the communication manager 1204 may perform one or more operations described elsewhere herein as being performed by one or more components of the communication manager 1204.

The communication manager 1204 may include a controller/processor, a memory, a scheduler, a communication unit, or a combination thereof, of the IAB donor CU described above in connection with FIG. 2. In some aspects, the communication manager 1204 includes a set of components, such as an obtaining component 1214, an establishing component 1216, or a combination thereof. Alternatively, the set of components may be separate and distinct from the communication manager 1204. In some aspects, one or more components of the set of components may include or may be implemented within a controller/processor, a memory, a scheduler, a communication unit, or a combination thereof, of the IAB donor CU described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive, from the apparatus 1208 associated with the apparatus 1210, a request for TNL address information for a connection between the apparatus 1208 and the apparatus 1210 via apparatus 1212 associated with the apparatus 1200. The obtaining component 1214 may obtain the TNL address information from the apparatus 1212 based at least in part on receiving the request. The transmission component 1206 may transmit the TNL address information to the apparatus 1208. The establishing component 1216 may establish an F1-C interface connection with the apparatus 1208. The transmission component 1206 may transmit the TNL address information to the apparatus 1208 over the F1-C interface connection.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by an integrated access and backhaul (IAB) node, comprising: receiving, from a first TAB donor centralized unit (CU) via a first parent distributed unit (DU) associated with the first TAB donor CU, a first indication to establish a first connection with a second parent DU associated with a second TAB donor CU; establishing the first connection with the second parent DU based at least in part on receiving the first indication; and establishing a second connection with the first TAB donor CU via the second parent DU, the first connection and the second connection forming a target path between the TAB node and the first TAB donor CU.

Aspect 2: The method of Aspect 1, further comprising receiving, via the target path, a second indication to transfer a child node from the first TAB donor CU to the second TAB donor CU, and transmitting a third indication to the child node to establish a third connection with the second TAB donor CU. Aspect 3: The method of Aspect 1 or 2, wherein the second connection includes an F1 control plane (F1-C) interface connection, an F1-C UE-associated interface connection, an F1-C non-UE-associated interface connection, an F1 user plane (F1-U) interface connection, or a non-F1 interface connection. Aspect 4: The method of any of Aspects 1-3, wherein the first parent DU and the second parent DU are implemented by a same physical TAB node.

Aspect 5: The method of any of Aspects 1-4, wherein establishing the first connection with the second parent DU comprises performing a handover from the first parent DU to the second parent DU, performing a secondary node change from the first parent DU to the second parent DU, or re-establishing a fourth connection with the second parent DU. Aspect 6: The method of any of Aspects 1-5, wherein establishing the first connection with the second parent DU comprises maintaining a fourth connection with the first parent DU.

Aspect 7: The method of any of Aspects 1-6, wherein establishing the second connection with the first TAB donor CU comprises establishing the second connection based at least in part on serving the child node on a first TAB DU of the TAB node, wherein the child node is to be transferred from the first TAB DU to a second TAB DU of the TAB node. Aspect 8: The method of any of Aspects 1-7, further comprising receiving transport network layer (TNL) address information, wherein establishing the second connection with the first TAB donor CU comprises establishing the second connection based at least in part on the TNL address information, and communicating with the first IAB donor CU via the target path based at least in part on the TNL address information.

Aspect 9: The method of any of Aspects 1-8, further comprising establishing a fourth connection with the second IAB donor CU via the second parent DU, wherein the fourth connection includes a radio resource control (RRC) connection or an F1 control (F1-C) interface connection. Aspect 10: The method of any of Aspects 1-9, further comprising receiving, from the second IAB donor CU, a configuration of one or more backhaul radio link control (RLC) channels to carry traffic for the second connection.

Aspect 11: The method of any of Aspects 1-10, further comprising receiving, from the second IAB donor CU, an indication of a mapping between traffic for the second connection and one or more backhaul radio link control (RLC) channels.

Aspect 12: A method of wireless communication performed by a first integrated access and backhaul (IAB) donor centralized unit (CU), comprising: transmitting, to an IAB node via a first parent distributed unit (DU) associated with the first IAB donor CU, a first indication to establish a first connection with a second parent DU associated with a second IAB donor CU; and establishing a second connection with the IAB node via the second parent DU, the first connection and the second connection forming a target path between the IAB node and the first IAB donor CU.

Aspect 13: The method of Aspect 12, wherein the second connection includes an F1 control plane (F1-C) interface connection, an F1-C UE-associated interface connection, an F1-C non-UE-associated interface connection, an F1 user plane (F1-U) interface connection, or a non-F1 interface connection. Aspect 14: The method of Aspect 12 or 13, further comprising transmitting first transport network layer (TNL) address information to at least one of a child node or a descendent node of the IAB node, and communicating with the child node or the descendent node via the target path based at least in part on the first TNL address information. Aspect 15: The method of Aspect 14, further comprising transmitting, to the second IAB donor CU, a request for second TNL address information, receiving the second TNL address information from the second IAB donor CU based at least in part on transmitting the request, and determining the first TNL address information based at least in part on the second TNL address information. Aspect 16: The method of Aspect 14 or 15, further comprising transmitting, to the second IAB donor CU, a third indication that the IAB node is to establish the second connection through an IAB donor DU associated with the second IAB donor CU, and receiving second TNL address information from the second IAB donor CU based at least in part on transmitting the third indication. Aspect 17: The method of any of Aspects 14-16, further comprising determining the first TNL address information based at least in part on the second TNL address information. Aspect 18: The method of Aspect 17, wherein the indication that the IAB node is to establish the second connection through the IAB donor DU is included in a request for the second TNL address information. Aspect 19: The method of Aspect 17 or 18, further comprising transmitting, to the IAB node via the target path, a second indication to transfer a child node of the IAB node from the first IAB donor CU to the second IAB donor CU.

Aspect 20: A method of wireless communication performed by a first integrated access and backhaul (IAB) donor centralized unit (CU), comprising: receiving, from a second IAB donor CU associated with an IAB node, a request for transport network layer (TNL) address information for a connection between the second IAB donor CU and the IAB node via an IAB donor distributed unit (DU) associated with the first IAB donor CU; obtaining the TNL address information from the IAB donor DU based at least in part on receiving the request; and transmitting the TNL address information to the second IAB donor CU.

Aspect 21: The method of Aspect 20, wherein obtaining the TNL address information from the IAB donor DU comprises: transmitting a second request for the TNL address information to the IAB donor DU; and receiving the TNL address information from the IAB donor DU based at least in part on transmitting the second request. Aspect 22: The method of Aspect 20 or 21, wherein transmitting the TNL address information to the second IAB donor CU comprises transmitting the TNL address information to the second IAB donor CU over an Xn or X2 base station interface. Aspect 23: The method of any of Aspects 20-22, wherein the TNL address information includes Internet protocol (IP) address information. Aspect 24: The method of any of Aspects 20-23, wherein the TNL address information includes an indication of an Internet protocol (IP) address. Aspect 25: The method of any of Aspects 20-24, wherein the TNL address information includes an indication of an Internet protocol (IP) prefix.

Aspect 26: A method of wireless communication performed by a first integrated access and backhaul (IAB) donor centralized unit (CU), comprising: transmitting, to a second IAB donor CU, a request for first transport network layer (TNL) address information for a connection between the first IAB donor CU and an IAB node associated with the first IAB donor CU, the connection being via an IAB donor distributed unit (DU) associated with the second IAB donor CU; receiving the first TNL address information from the second IAB donor CU based at least in part on transmitting the request; determining second TNL address information based at least in part on the first TNL address information; and transmitting the second TNL address information to the IAB node.

Aspect 27: The method of Aspect 26, wherein the second TNL address information includes Internet protocol (IP) address information. Aspect 28: The method of Aspect 26 or 27, wherein the second TNL address information includes an indication of an Internet protocol (IP) address or an indication of an IP prefix. Aspect 29: The method of any of Aspects 26-28, wherein the second TNL address information is based at least in part on an Internet protocol (IP) prefix associated with the IAB donor DU.

Aspect 30: The method of any of Aspects 26-29, wherein the first TNL address information and the second TNL address information are a same TNL address information, or wherein the second TNL address information is derived from the first TNL address information.

Aspect 31: An apparatus for wireless communication at a device, comprising a processor; memory coupled with the processor; and instructions stored in the memory and executable by the processor to cause the apparatus to perform the method of one or more of Aspects 1-11.

Aspect 32: A device for wireless communication, comprising a memory and one or more processors coupled to the memory, the one or more processors configured to perform the method of one or more of Aspects 1-11.

Aspect 33: An apparatus for wireless communication, comprising at least one means for performing the method of one or more of Aspects 1-11.

Aspect 34: A non-transitory computer-readable medium storing code for wireless communication, the code comprising instructions executable by a processor to perform the method of one or more of Aspects 1-11.

Aspect 35: A non-transitory computer-readable medium storing a set of instructions for wireless communication, the set of instructions comprising one or more instructions that, when executed by one or more processors of a device, cause the device to perform the method of one or more of Aspects 1-11.

Aspect 36: An apparatus for wireless communication at a device, comprising a processor; memory coupled with the processor; and instructions stored in the memory and executable by the processor to cause the apparatus to perform the method of one or more of Aspects 12-19.

Aspect 37: A device for wireless communication, comprising a memory and one or more processors coupled to the memory, the one or more processors configured to perform the method of one or more of Aspects 12-19.

Aspect 38: An apparatus for wireless communication, comprising at least one means for performing the method of one or more of Aspects 12-19.

Aspect 39: A non-transitory computer-readable medium storing code for wireless communication, the code comprising instructions executable by a processor to perform the method of one or more of Aspects 12-19.

Aspect 40: A non-transitory computer-readable medium storing a set of instructions for wireless communication, the set of instructions comprising one or more instructions that, when executed by one or more processors of a device, cause the device to perform the method of one or more of Aspects 12-19.

Aspect 41: An apparatus for wireless communication at a device, comprising a processor; memory coupled with the processor; and instructions stored in the memory and executable by the processor to cause the apparatus to perform the method of one or more of Aspects 20-25.

Aspect 42: A device for wireless communication, comprising a memory and one or more processors coupled to the memory, the one or more processors configured to perform the method of one or more of Aspects 20-25.

Aspect 43: An apparatus for wireless communication, comprising at least one means for performing the method of one or more of Aspects 20-25.

Aspect 44: A non-transitory computer-readable medium storing code for wireless communication, the code comprising instructions executable by a processor to perform the method of one or more of Aspects 20-25.

Aspect 45: A non-transitory computer-readable medium storing a set of instructions for wireless communication, the set of instructions comprising one or more instructions that, when executed by one or more processors of a device, cause the device to perform the method of one or more of Aspects 20-25.

Aspect 46: An apparatus for wireless communication at a device, comprising a processor; memory coupled with the processor; and instructions stored in the memory and executable by the processor to cause the apparatus to perform the method of one or more of Aspects 26-30.

Aspect 47: A device for wireless communication, comprising a memory and one or more processors coupled to the memory, the one or more processors configured to perform the method of one or more of Aspects 26-30.

Aspect 48: An apparatus for wireless communication, comprising at least one means for performing the method of one or more of Aspects 26-30.

Aspect 49: A non-transitory computer-readable medium storing code for wireless communication, the code comprising instructions executable by a processor to perform the method of one or more of Aspects 26-30.

Aspect 50: A non-transitory computer-readable medium storing a set of instructions for wireless communication, the set of instructions comprising one or more instructions that, when executed by one or more processors of a device, cause the device to perform the method of one or more of Aspects 26-30.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or combinations thereof.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used.

Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a first integrated access and backhaul (IAB) donor centralized unit (CU), comprising:
   receiving, from a second IAB donor CU associated with an IAB node, a request for transport network layer (TNL) address information for a connection between the second IAB donor CU and the IAB node via an IAB donor distributed unit (DU) associated with the first IAB donor CU;
   transmitting, to the IAB donor DU, a second request for the TNL address information based at least in part on receiving the request;
   receiving, from the IAB donor DU, the TNL address information based at least in part on transmitting the second request; and
   transmitting the TNL address information to the second IAB donor CU.

2. The method of claim 1, wherein transmitting the TNL address information to the second IAB donor CU comprises transmitting the TNL address information to the second IAB donor CU over an Xn base station interface or an X2 base station interface.

3. The method of claim 2, wherein transmitting the TNL address information to the second IAB donor CU comprises transmitting the TNL address information to the second IAB donor CU over the Xn base station interface.

4. The method of claim 1, wherein the TNL address information includes Internet protocol (IP) address information.

5. The method of claim 1, wherein the TNL address information includes an indication of an Internet protocol (IP) address.

6. The method of claim 1, wherein the TNL address information includes an indication of an Internet protocol (IP) prefix.

7. A first integrated and backhaul (IAB) donor centralized unit (CU), comprising:
   one or more memories; and
   one or more processors, coupled to the one or more memories, configured to:
   receive, from a second IAB donor CU associated with an IAB node, a request for transport network layer (TNL) address information for a connection between the second IAB donor CU and the IAB node via an IAB donor distributed unit (DU) associated with the first IAB donor CU;
   transmit, to the IAB donor DU, a second request for the TNL address information based at least in part on receiving the request;
   receive, from the IAB donor DU, the TNL address information based at least in part on transmitting the second request; and
   transmit the TNL address information to the second IAB donor CU.

8. The first IAB donor CU of claim 7, wherein the one or more processors, to transmit the TNL address information to the second IAB donor CU, are configured to transmit the TNL address information to the second IAB donor CU over an Xn base station interface or an X2 base station interface.

9. The first IAB donor CU of claim 8, wherein the one or more processors, to transmit the TNL address information to the second IAB donor CU, are configured to transmit the TNL address information to the second IAB donor CU over the Xn base station interface.

10. The first IAB donor CU of claim 7, wherein the TNL address information includes Internet protocol (IP) address information.

11. The first IAB donor CU of claim 7, wherein the TNL address information includes an indication of an Internet protocol (IP) address.

12. The first IAB donor CU of claim 7, wherein the TNL address information includes an indication of an Internet protocol (IP) prefix.

13. A non-transitory computer-readable medium storing a set of instructions for wireless communication, the set of instructions comprising:
   one or more instructions that, when executed by one or more processors of a first integrated access and backhaul (IAB) donor centralized unit (CU), cause the first IAB donor CU to:
   receive, from a second IAB donor CU associated with an IAB node, a request for transport network layer (TNL) address information for a connection between the second IAB donor CU and the IAB node via an IAB donor distributed unit (DU) associated with the first IAB donor CU;
   transmit, to the IAB donor DU, a second request for the TNL address information based at least in part on receiving the request;
   receive, from the IAB donor DU, the TNL address information based at least in part on transmitting the second request; and
   transmit the TNL address information to the second IAB donor CU.

14. The non-transitory computer-readable medium of claim 13, wherein the one or more instructions, that cause the first IAB donor CU to transmit the TNL address information to the second IAB donor CU, cause the first IAB donor CU to transmit the TNL address information to the second IAB donor CU over an Xn base station interface or an X2 base station interface.

15. The non-transitory computer-readable medium of claim 14, wherein the one or more instructions, that cause the first IAB donor CU to transmit the TNL address information to the second IAB donor CU, cause the first IAB donor CU to transmit the TNL address information to the second IAB donor CU over the Xn base station interface.

16. The non-transitory computer-readable medium of claim 13, wherein the TNL address information includes Internet protocol (IP) address information.

17. The non-transitory computer-readable medium of claim 13, wherein the TNL address information includes an indication of an Internet protocol (IP) address.

18. The non-transitory computer-readable medium of claim 13, wherein the TNL address information includes an indication of an Internet protocol (IP) prefix.

19. A first apparatus for wireless communication, comprising:
   means for receiving, from a second apparatus associated with an integrated access and backhaul (IAB) node, a request for transport network layer (TNL) address information for a connection between the second apparatus and the IAB node via an IAB donor distributed unit (DU) associated with the first apparatus;
   means for transmitting, to the LAB donor DU, a second request for the TNL address information based at least in part on receiving the request;
   means for receiving, from the IAB donor DU, the TNL address information based at least in part on transmitting the second request; and
   means for transmitting the TNL address information to the second apparatus.

20. The first apparatus of claim 19, wherein the means for transmitting the TNL address information to the second apparatus comprises means for transmitting the TNL address information to the second apparatus over an Xn base station interface.

21. The first apparatus of claim 19, wherein the TNL address information includes Internet protocol (IP) address information.

22. The first apparatus of claim 19, wherein the TNL address information includes an indication of an Internet protocol (IP) address.

23. The first apparatus of claim 19, wherein the TNL address information includes an indication of an Internet protocol (IP) prefix.

24. The first apparatus of claim 19, wherein the means for transmitting the TNL address information to the second apparatus comprises means for transmitting the TNL address information to the second apparatus over an X2 base station interface.

25. The first apparatus of claim 19, wherein the TNL address information includes Internet protocol (IP) address information.

26. The method of claim 2, wherein transmitting the TNL address information to the second IAB donor CU comprises transmitting the TNL address information to the second IAB donor CU over the X2 base station interface.

27. The method of claim 1, wherein receiving the request comprises:
   receiving, by the first IAB donor CU and from the second IAB donor CU, the request.

28. The first IAB donor CU of claim 8, wherein the one or more processors, to transmit the TNL address information to the second IAB donor CU, are configured to transmit the TNL address information to the second IAB donor CU over the X2 base station interface.

29. The first IAB donor CU of claim 8, wherein, to receive the request, the one or more processors are configured to cause the first IAB donor CU to receive the request from the second IAB donor CU.

30. The non-transitory computer-readable medium of claim 14, wherein the one or more instructions, that cause the first IAB donor CU to transmit the TNL address information to the second IAB donor CU, cause the first IAB donor CU to transmit the TNL address information to the second IAB donor CU over the X2 base station interface.

* * * * *